(12) United States Patent
Takakura et al.

(10) Patent No.: US 6,978,598 B2
(45) Date of Patent: Dec. 27, 2005

(54) DETERIORATED STATE EVALUATION DEVICE FOR EXHAUST EMISSION CONTROL EQUIPMENT

(75) Inventors: Shiro Takakura, Wako (JP); Tetsuo Endo, Wako (JP); Kei Machida, Wako (JP); Norihito Watanabe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 153 days.

(21) Appl. No.: 10/484,561

(22) PCT Filed: Aug. 23, 2002

(86) PCT No.: PCT/JP02/08527

§ 371 (c)(1),
(2), (4) Date: Jan. 23, 2004

(87) PCT Pub. No.: WO03/023202

PCT Pub. Date: Mar. 20, 2003

(65) Prior Publication Data

US 2004/0168509 A1    Sep. 2, 2004

(30) Foreign Application Priority Data

Sep. 5, 2001   (JP) ............................. 2001-268319

(51) Int. Cl.[7] .............................................. F01N 3/00
(52) U.S. Cl. ........................... 60/277; 60/276; 60/295; 60/297; 73/118.1
(58) Field of Search .................. 60/274, 276, 277, 60/284, 285, 295, 297, 299, 300; 73/118.1

(56) References Cited

U.S. PATENT DOCUMENTS

| | | | | |
|---|---|---|---|---|
| 5,595,060 A | * | 1/1997 | Togai et al. | 60/274 |
| 6,357,227 B1 | * | 3/2002 | Neufert | 60/309 |
| 6,594,985 B2 | * | 7/2003 | Surnilla et al. | 60/277 |
| 6,763,655 B2 | * | 7/2004 | Ueno et al. | 60/277 |
| 6,772,586 B2 | * | 8/2004 | Miyahara et al. | 60/277 |

FOREIGN PATENT DOCUMENTS

| | | | | |
|---|---|---|---|---|
| JP | 5-272329 | | 10/1993 | |
| JP | 405256124 A | * | 10/1993 | 60/287 |
| JP | 7-158425 | | 6/1995 | |
| JP | 08-144744 | | 6/1996 | |
| JP | 10-159543 | | 6/1998 | |
| JP | 11-6424 | | 1/1999 | |
| JP | 2001-182528 | | 7/2001 | |
| WO | WO 01/46569 | | 6/2001 | |

* cited by examiner

*Primary Examiner*—Binh Q. Tran
(74) *Attorney, Agent, or Firm*—Westerman, Hattori, Daniels & Adrian, LLP

(57) ABSTRACT

A humidity sensor 4 is disposed downstream of an exhaust gas purifier comprising a hydrocarbon adsorbing catalyst 2, and an air-fuel ratio sensor 5 is disposed at least downstream of the exhaust gas purifier. The hydrocarbon adsorbing ability of a hydrocarbon adsorbent of a hydrocarbon adsorbing catalyst 2 (the exhaust gas purifier) is evaluated using output data of the humidity sensor 4. The unburned gas purifying ability based on a catalytic action of the hydrocarbon adsorbing catalyst 2 is evaluated using output data of the air-fuel ratio sensor 5. Based on the evaluated results, the overall deteriorated state of the exhaust gas purifier is evaluated. The overall deteriorated state of the exhaust gas purifier which has the hydrocarbon adsorbing catalyst 2 can thus adequately be evaluated.

10 Claims, 16 Drawing Sheets

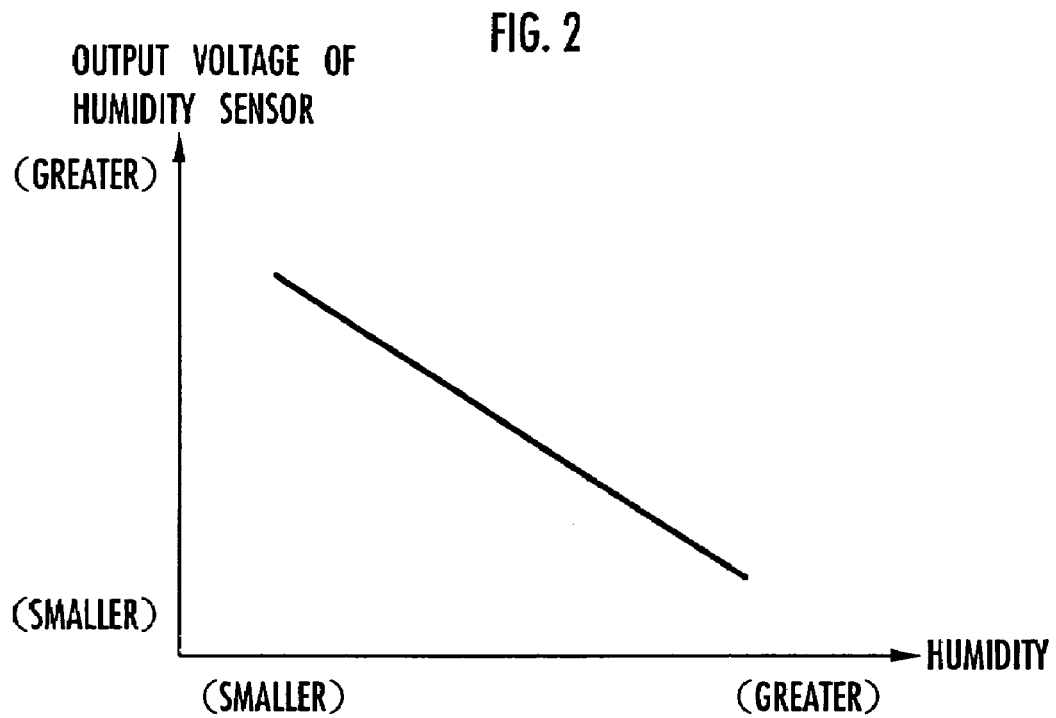
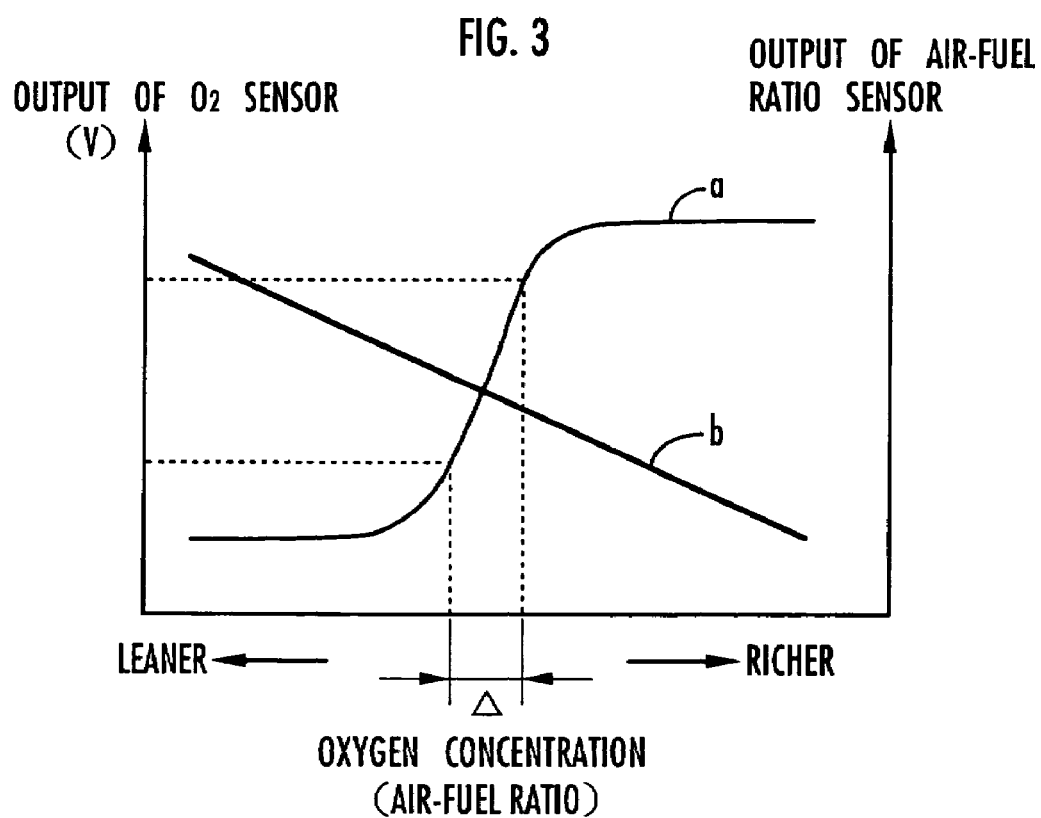

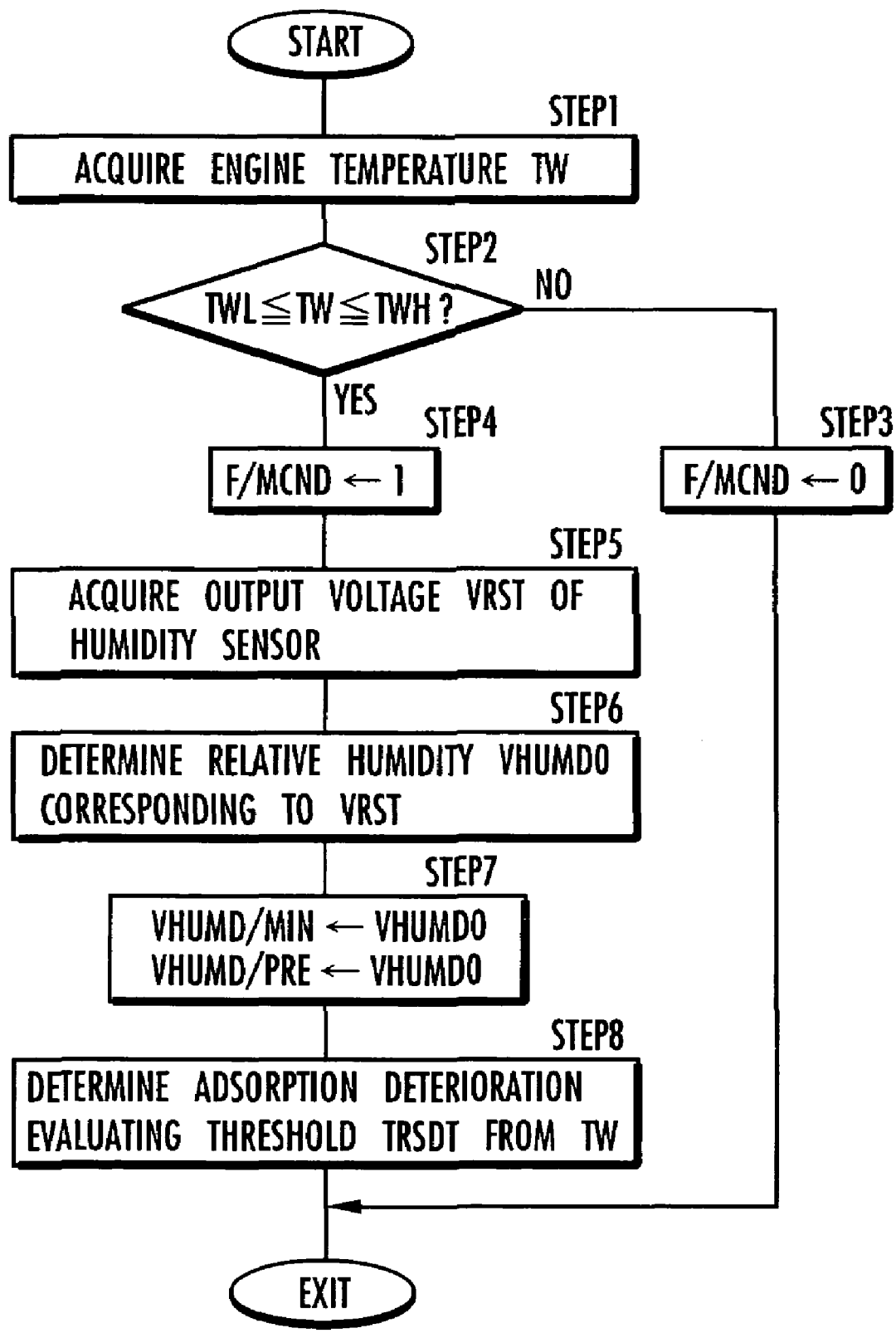

DETERIORATED STATE EVALUATION DEVICE FOR EXHAUST EMISSION CONTROL EQUIPMENT

TECHNICAL FIELD

The present invention relates to an apparatus for evaluating the deteriorated state of an exhaust gas purifier including a hydrocarbon adsorbing catalyst.

BACKGROUND ART

The exhaust passages of internal combustion engines generally incorporate therein a catalytic converter comprising a three-way catalyst or the like for purifying unburned gases of hydrocarbon (HC), carbon monoxide (CO), nitrogen oxides (NOx), etc. in the exhaust gases by the catalytic action (oxidation-reduction action). However, when the catalytic converter is at a low temperature such as when the internal combustion engine starts to operate at a low temperature, the catalytic converter is not sufficiently activated. In such a condition, hydrocarbons in particular tend to be emitted in large quantities.

There has been known in the art a hybrid hydrocarbon adsorbing catalyst which comprises a composite combination of a hydrocarbon adsorbent such as zeolite and a three-way catalyst disposed in the exhaust gas passage. The hydrocarbon adsorbing catalyst may comprise, for example, a carrier of honeycomb structure whose surface is coated with a hydrocarbon adsorbent of zeolite and which carries a precious metal such as platinum, palladium, rhodium, or the like as a constituent material of the three-way catalyst. The hydrocarbon adsorbent of zeolite or the like has a function to adsorb hydrocarbons in the exhaust gas at relatively low temperatures below 100° C., for example, and operates to release the adsorbed hydrocarbons when heated to a certain temperature in the range from 100 to 250° C., for example.

In recent years, there have been demands in the art for the recognition of a deteriorated state of an exhaust gas purifier for grasping the need for replacement of the exhaust gas purifier. Such demands also exist for exhaust gas purifiers having hydrocarbon adsorbing catalysts. One conventional technique for evaluating a deteriorated state of a hydrocarbon adsorbing catalyst is known from Japanese laid-open patent publication No. 10-159543, for example. According to the known technique, temperature sensors are disposed respectively upstream and downstream of an exhaust gas purifier having a hydrocarbon adsorbing catalyst. The temperature downstream of the exhaust gas purifier is estimated from the temperature detected by the upstream temperature sensor on the assumption that the hydrocarbon adsorbing catalyst is in a non-deteriorated brand-new state. The actual deteriorated state of the hydrocarbon adsorbing catalyst is evaluated based on the difference between the estimated temperature and the temperature detected by the downstream temperature sensor.

The above technique serves to evaluate the ability of the hydrocarbon adsorbent of the hydrocarbon adsorbing catalyst to adsorb hydrocarbons, but does not evaluate an overall deteriorated state of the exhaust gas purifier including the purifying capability of the three-way catalyst thereof. Therefore, if the three-way catalyst is deteriorated earlier than the ability of the hydrocarbon adsorbing catalyst to adsorb hydrocarbons, then when a deterioration of the hydrocarbon adsorbing catalyst (i.e., a deterioration that demands replacement of the hydrocarbon adsorbing catalyst) is recognized by the technique disclosed in Japanese laid-open patent publication No. 10-159543, the intrinsic ability of the overall hydrocarbon adsorbing catalyst to purify exhaust gases has already been lost. Stated otherwise, the technique disclosed in Japanese laid-open patent publication No. 10-159543 fails to evaluate appropriately the entire evaluated state of the exhaust gas purifier which has the hydrocarbon adsorbing catalyst.

Furthermore, inasmuch as the temperatures detected by the temperature sensors disposed upstream and downstream of the exhaust gas purifier tend to be affected by various factors including an ambient temperature, etc., it is difficult to evaluate, with accuracy, the deteriorated state of the hydrocarbon adsorbent of the hydrocarbon adsorbing catalyst. In addition, the above technique is also disadvantageous as to cost because of the need for the temperature sensors disposed upstream and downstream of the exhaust gas purifier.

Various techniques for evaluating a deteriorated state of a catalytic converter comprising a three-way catalyst or the like are known in the art (e.g., Japanese laid-open patent publication No. 8-144744, Japanese laid-open patent publication No. 2001-182528, and PCT international publication WO/01/46569/A1 filed by the present applicant, etc.). These techniques basically serve to evaluate a deteriorated state of a catalytic converter (a deteriorated state of the ability of a catalyst to purify unburned gases) using output data of an air-fuel sensor such as an oxygen concentration sensor that is disposed downstream of the catalytic converter or air-fuel sensors that are disposed respectively downstream and upstream of the catalytic converter.

The present invention has been made in view of the above background. It is an object of the present invention to provide a deteriorated state evaluating apparatus which is capable of appropriately evaluating a deteriorated state of an overall exhaust gas purifier having a hydrocarbon adsorbing catalyst.

DISCLOSURE OF THE INVENTION

According to the findings of the inventor of the present invention, a hydrocarbon adsorbent such as zeolite or the like as one component of a hydrocarbon adsorbing catalyst has a property capable of adsorbing not only hydrocarbons but also moisture contained in the exhaust gas emitted from an internal combustion engine. The ability of the hydrocarbon adsorbent to adsorb moisture (a maximum amount of moisture that can be adsorbed) is highly correlated to its ability to adsorb hydrocarbons (a maximum amount of hydrocarbons that can be adsorbed). The ability to adsorb moisture and the ability to adsorb hydrocarbons drop in the same manner as each other when the hydrocarbon adsorbent is progressively deteriorated. If a humidity sensor is disposed downstream of the hydrocarbon adsorbing catalyst, for example, then the humidity (detected humidity) represented by the output of the humidity sensor, i.e., the humidity which is present downstream of the hydrocarbon adsorbent, undergoes the following transition, after the internal combustion engine has started to operate: Immediately after the internal combustion engine has started to operate, the humidity which is present downstream of the hydrocarbon adsorbing catalyst is basically of a substantially constant low level as moisture contained in the exhaust gas is adsorbed by the hydrocarbon adsorbent. When the adsorption of moisture by the hydrocarbon adsorbent goes on until it is saturated, since the hydrocarbon adsorbent is no longer capable of adsorbing moisture in the exhaust gas, the humidity which is present downstream of the hydrocarbon adsorbing catalyst is not adsorbed by the hydrocarbon adsorbent, but monotonously increases to a high humidity level due to the moisture contained in the exhaust gas that passes through the hydrocarbon adsorbing catalyst. Consequently, the adsorption of moisture and hence the adsorption of hydrocarbons by the hydrocarbon adsorbent of the hydrocarbon adsorbing catalyst can be grasped using the data of the output of the humidity sensor which detects the humidity downstream of the hydrocarbon adsorbing catalyst. More specifically, the timing at which the humidity detected by the humidity sensor disposed downstream of the hydrocarbon adsorbing catalyst becomes a monotonously increasing state can be grasped as the timing at which the adsorption of moisture by the hydrocarbon adsorbent of the hydrocarbon adsorbing catalyst is saturated. Therefore, it is possible to evaluate the deteriorated state of the ability of the hydrocarbon adsorbing catalyst to adsorb hydrocarbons.

As described in detail later on, when not only the humidity downstream of the hydrocarbon adsorbing catalyst, but also the humidity upstream of the hydrocarbon adsorbing catalyst are detected by the respective humidity sensors, the adsorption of moisture by the hydrocarbon adsorbent can be grasped more accurately using the output data of both the humidity sensors disposed downstream and upstream of the hydrocarbon adsorbing catalyst. This is because the saturated timing of the adsorption of moisture by the hydrocarbon adsorbent of the hydrocarbon adsorbing catalyst can be grasped using the output data of the downstream humidity sensor as described above, and simultaneously the timing at which the adsorption of moisture by the hydrocarbon adsorbent is substantially started can be grasped based on the output data of the upstream humidity sensor. As a result, it is possible to evaluate adequately the ability of the hydrocarbon adsorbing catalyst to adsorb hydrocarbons.

Furthermore, the deteriorated state of the ability of the hydrocarbon adsorbing catalyst to purify unburned gases due to a catalytic action thereof can be evaluating using the conventional technique of evaluating the deteriorated state of the catalytic converter (the technique using the air-fuel ratio sensor disposed downstream of the catalytic converter). Even if the exhaust passage incorporates a hydrocarbon adsorbing catalyst and a catalytic converter comprising a three-way catalyst or the like separate from the hydrocarbon adsorbing catalyst at downstream or upstream thereof, the deteriorated state of the overall ability to purify unburned gases of the combination of the hydrocarbon adsorbing catalyst and the catalytic converter can be evaluated using the air-fuel ratio sensor. In the present specification, according to the present invention to be described below, the term "unburned gases" are used in terms of a wider concept than combustible gases (CO, HC, etc.) in their intrinsic sense, and used to mean collectively "components to be purified" (gas components to be purified) including NOx, etc. in the exhaust gas emitted from the internal combustion engine.

An apparatus for evaluating the deteriorated state of an exhaust gas purifier according to the present invention has been devised in view of the above matters. A basic invention for achieving the above object is available in four aspects. According to the first and second aspects, there is provided an apparatus for evaluating a deteriorated state of an exhaust gas purifier disposed in an exhaust passage of an internal combustion engine and including a hydrocarbon adsorbing catalyst having a function to adsorb hydrocarbons in an exhaust gas which flows through the exhaust passage and a function to purify unburned gases in the exhaust gas based on a catalytic action. According to the first aspect, the apparatus comprises a humidity sensor disposed downstream of the hydrocarbon adsorbing catalyst for generating an output depending on a humidity of the exhaust gas, an air-fuel ratio sensor disposed at least downstream of the hydrocarbon adsorbing catalyst for generating an output depending on an air-fuel ratio of the exhaust gas, adsorbing ability evaluating means for evaluating a hydrocarbon adsorbing ability of the hydrocarbon adsorbing catalyst using output data of the humidity sensor, and purifying ability evaluating means for evaluating an unburned gas purifying ability of the hydrocarbon adsorbing catalyst using output data of the air-fuel ratio sensor, wherein the deteriorated state of the exhaust gas purifier is evaluated based on evaluated results from both the adsorbing ability evaluating means and the purifying ability evaluating means (first invention).

According to the second aspect, the apparatus comprises a downstream humidity sensor and an upstream humidity sensor disposed respectively downstream and upstream of the hydrocarbon adsorbing catalyst for generating respective outputs depending on a humidity of the exhaust gas, an air-fuel ratio sensor disposed at least downstream of the hydrocarbon adsorbing catalyst for generating an output depending on an air-fuel ratio of the exhaust gas, adsorbing ability evaluating means for evaluating a hydrocarbon adsorbing ability of the hydrocarbon adsorbing catalyst using output data of the upstream humidity sensor and the downstream humidity sensor, and purifying ability evaluating means for evaluating an unburned gas purifying ability of the hydrocarbon adsorbing catalyst using output data of the air-fuel ratio sensor, wherein the deteriorated state of the exhaust gas purifier is evaluated based on evaluated results from both the adsorbing ability evaluating means and the purifying ability evaluating means (second invention).

According to the first aspect (first invention), since the humidity sensor is disposed downstream of the exhaust gas purifier comprising the hydrocarbon adsorbing catalyst, the adsorbed state of moisture adsorbed by a hydrocarbon adsorbent of the hydrocarbon adsorbing catalyst and hence the adsorbed state of hydrocarbons adsorbed thereby can be grasped using the output data of the humidity sensor, as described above. Consequently, the adsorbing ability evaluating means can evaluate the hydrocarbon adsorbing ability of the hydrocarbon adsorbing catalyst using the output data of the humidity sensor. According to the second aspect (second invention), since the humidity sensors are disposed respectively downstream and upstream of the exhaust gas purifier comprising the hydrocarbon adsorbing catalyst, the adsorbed state of moisture adsorbed by a hydrocarbon adsorbent of the hydrocarbon adsorbing catalyst and hence the adsorbed state of hydrocarbons adsorbed thereby can be grasped more accurately using the output data of the upstream and downstream humidity sensors. Consequently, the adsorbing ability evaluating means can more appropriately evaluate the hydrocarbon adsorbing ability of the hydrocarbon adsorbing catalyst using the output data of the humidity sensors.

According to the first and second aspects (first and second inventions), since the air-fuel ratio sensor is disposed at least downstream of the hydrocarbon adsorbing catalyst in either of the aspects, the purifying ability evaluating means can evaluate the unburned gas purifying ability based on a catalytic action of the hydrocarbon adsorbing catalyst using the output data of the air-fuel ratio sensor. According to the first and second aspects, because the deteriorated state of the exhaust gas purifier is evaluated based on the evaluated results from both the evaluating means, the overall deteriorated state of the exhaust gas purifier comprising the hydrocarbon adsorbing catalyst can appropriately be evaluated.

For detecting, for example, a certain deteriorated state of the exhaust gas purifier (e.g., a deteriorated state which requires the exhaust gas purifier or the hydrocarbon adsorbing catalyst thereof to be replaced), the exhaust gas purifier as a whole may be judged as being deteriorated when either one of the hydrocarbon adsorbing ability and the unburned gas purifying ability of the hydrocarbon adsorbing catalyst has dropped a predetermined extent.

More specifically, in the first or second invention, if the adsorbing ability evaluating means comprises means for evaluating the hydrocarbon adsorbing ability of the hydrocarbon adsorbing catalyst in two classified high and low levels, and the purifying ability evaluating means comprises means for evaluating the unburned gas purifying ability of the hydrocarbon adsorbing catalyst in two classified high and low levels, then when the hydrocarbon adsorbing ability of the hydrocarbon adsorbing catalyst is evaluated as being in the high level by the adsorbing ability evaluating means and the unburned gas purifying ability of the hydrocarbon adsorbing catalyst is evaluated as being in the high level by the purifying ability evaluating means, the exhaust gas purifier is judged as being not deteriorated, and when either one of the hydrocarbon adsorbing ability and the unburned gas purifying ability is evaluated as being in the low level, the exhaust gas purifier is judged as being deteriorated (ninth invention). With this arrangement, if either one of the hydrocarbon adsorbing ability and the exhaust gas purifying ability is deteriorated, then the exhaust gas purifier is judged as being deteriorated. Accordingly, either one of the hydrocarbon adsorbing ability and the exhaust gas purifying ability is prevented from being already deteriorated before the exhaust gas purifier is judged as being deteriorated.

According to the third and fourth aspects, there is provided an apparatus for evaluating a deteriorated state of an exhaust gas purifier disposed in an exhaust passage of an internal combustion engine and including a hydrocarbon adsorbing catalyst having a function to adsorb hydrocarbons in an exhaust gas which flows through the exhaust passage and a function to purify unburned gases in the exhaust gas based on a catalytic action, and a catalytic converter disposed in the exhaust passage independently of the hydrocarbon adsorbing catalyst for purifying the unburned gases based on a catalytic action. According to the third aspect, the apparatus comprises a humidity sensor disposed at least downstream of the hydrocarbon adsorbing catalyst for generating an output depending on a humidity of the exhaust gas, an air-fuel ratio sensor disposed at least downstream of the exhaust gas purifier for generating an output depending on an air-fuel ratio of the exhaust gas, adsorbing ability evaluating means for evaluating a hydrocarbon adsorbing ability of the hydrocarbon adsorbing catalyst using output data of the humidity sensor, and purifying ability evaluating means for evaluating an overall unburned gas purifying ability of the exhaust gas purifier using output data of the air-fuel ratio sensor, wherein the deteriorated state of the exhaust gas purifier is evaluated based on evaluated results from both the adsorbing ability evaluating means and the purifying ability evaluating means (third invention).

According to the fourth aspect, the apparatus comprises a downstream humidity sensor and an upstream humidity sensor disposed respectively downstream and upstream of the hydrocarbon adsorbing catalyst for generating respective outputs depending on a humidity of the exhaust gas, an air-fuel ratio sensor disposed at least downstream of the exhaust gas purifier for generating an output depending on an air-fuel ratio of the exhaust gas, adsorbing ability evaluating means for evaluating a hydrocarbon adsorbing ability of the hydrocarbon adsorbing catalyst using output data of the humidity sensors, and purifying ability evaluating means for evaluating an overall unburned gas purifying ability of the exhaust gas purifier using output data of the air-fuel ratio sensor, wherein the deteriorated state of the exhaust gas purifier is evaluated based on evaluated results from both the adsorbing ability evaluating means and the purifying ability evaluating means (fourth invention).

According to the third and fourth aspects (third and fourth inventions), the exhaust gas purifier has the hydrocarbon adsorbing catalyst and the catalytic converter which are independent of each other. The catalytic converter is disposed upstream or downstream of the hydrocarbon adsorbing catalyst. According to the third aspect (third invention), since the humidity sensor is disposed downstream of the hydrocarbon adsorbing catalyst (in a location between the hydrocarbon adsorbing catalyst and the catalytic converter if the catalytic converter is disposed downstream of the hydrocarbon adsorbing catalyst), the adsorbed state of moisture adsorbed by a hydrocarbon adsorbent of the hydrocarbon adsorbing catalyst and hence the adsorbed state of hydrocarbons adsorbed thereby can be grasped using the output data of the humidity sensor. Consequently, the adsorbing ability evaluating means can evaluate the hydrocarbon adsorbing ability of the hydrocarbon adsorbing catalyst using the output data of the humidity sensor. According to the fourth aspect (fourth invention), since the downstream humidity sensor is disposed downstream of the hydrocarbon adsorbent catalyst (in a location between the hydrocarbon adsorbing catalyst and the catalytic converter if the catalytic converter is disposed downstream of the hydrocarbon adsorbing catalyst), and the upstream humidity sensor is disposed upstream of the hydrocarbon adsorbing catalyst (in a location between the hydrocarbon adsorbent and the catalytic converter if the catalytic converter is disposed upstream of the hydrocarbon adsorbing catalyst), the adsorbed state of moisture adsorbed by a hydrocarbon adsorbent of the hydrocarbon adsorbing catalyst and hence the adsorbed state of hydrocarbons adsorbed thereby can be grasped more accurately. Consequently, the adsorbing ability evaluating means can more appropriately evaluate the hydrocarbon adsorbing ability of the hydrocarbon adsorbing catalyst using the output data of the humidity sensors.

According to the third and fourth aspects, since the air-fuel ratio sensor is disposed at least downstream of the overall exhaust gas purifier in either of the aspects, the purifying ability evaluating means can evaluate the overall unburned gas purifying ability of the exhaust gas purifier which is a combination of the unburned gas purifying ability based on a catalytic action of the hydrocarbon adsorbing catalyst and the unburned gas purifying ability of the catalytic converter, using the output data of the air-fuel ratio sensor. According to the third and fourth aspects, as with the first and second aspects, because the deteriorated state of the exhaust gas purifier is evaluated based on the evaluated results from both the evaluating means, the overall deteriorated state of the exhaust gas purifier comprising the hydrocarbon adsorbing catalyst and the catalytic converter can appropriately be evaluated.

For detecting, for example, a certain deteriorated state of the exhaust gas purifier (e.g., a deteriorated state which requires the exhaust gas purifier or the hydrocarbon adsorbing catalyst thereof to be replaced), the exhaust gas purifier as a whole may be judged as being deteriorated when either one of the hydrocarbon adsorbing ability of the hydrocarbon adsorbing catalyst and the overall unburned gas purifying ability of the exhaust gas purifier has dropped a predetermined extent, as with the first and second aspects.

More specifically, in the third or fourth second invention, if the adsorbing ability evaluating means comprises means for evaluating the hydrocarbon adsorbing ability of the hydrocarbon adsorbing catalyst in two classified high and low levels, and the purifying ability evaluating means comprises means for evaluating the overall unburned gas purifying ability of the exhaust gas purifier in two classified high and low levels, then when the hydrocarbon adsorbing ability of the hydrocarbon adsorbing catalyst is evaluated as being in the high level by the adsorbing ability evaluating means and the unburned gas purifying ability of the exhaust gas purifier is evaluated as being in the high level by the purifying ability evaluating means, the exhaust gas purifier is judged as being not deteriorated, and when either one of the hydrocarbon adsorbing ability and the unburned gas purifying ability is evaluated as being in the low level, the exhaust gas purifier is judged as being deteriorated (tenth invention). With this arrangement, if either one of the hydrocarbon adsorbing ability of the hydrocarbon adsorbing catalyst and the overall exhaust gas purifying ability of the exhaust gas purifier is deteriorated, then the exhaust gas purifier is judged as being deteriorated. Accordingly, either one of the hydrocarbon adsorbing catalyst and the catalytic converter independent thereof is prevented from being already deteriorated before the exhaust gas purifier is judged as being deteriorated.

In the first aspect (the first invention or a combination thereof with the ninth invention) or the third aspect (the third invention or a combination thereof with the tenth invention) wherein the humidity sensor is disposed downstream of the hydrocarbon adsorbing catalyst, with respect to the evaluation of the hydrocarbon adsorbing ability of the hydrocarbon adsorbing catalyst in particular, the apparatus further comprises means for sequentially generating a deterioration evaluating parameter representative of an integrated amount of moisture which is given to the hydrocarbon adsorbing catalyst by the exhaust gas from the time when the internal combustion engine has started to operate, wherein the adsorbing ability evaluating means detects a timing at which the humidity represented by the output data of the humidity sensor becomes a monotonously increasing state while sequentially monitoring the output data of the humidity sensor after the internal combustion engine has started to operate, and compares the value of the deterioration evaluating parameter at the detected timing with a predetermined threshold thereby to evaluate the hydrocarbon adsorbing ability of the hydrocarbon adsorbing catalyst (fifth invention).

Specifically, the humidity (detected humidity) represented by the output data of the humidity sensor disposed downstream of the hydrocarbon adsorbing catalyst is of a substantially constant level until the absorption of moisture by the hydrocarbon adsorbent of the hydrocarbon adsorbing catalyst is saturated after the internal combustion engine has started to operate. After the absorption of moisture is saturated, the humidity detected by the humidity sensor increases monotonously. Therefore, when a timing at which the humidity represented by the output data of the humidity sensor becomes a monotonously increasing state is detected, a timing at which the absorption of moisture by the hydrocarbon adsorbing catalyst is saturated (this timing is also a timing at which the absorption of hydrocarbons by the hydrocarbon adsorbent is saturated) is grasped. An integrated amount of moisture that has been supplied to the hydrocarbon adsorbing catalyst after the internal combustion engine has started to operate until the above timing (hereinafter referred to as "adsorption saturation timing") corresponds to a maximum amount of moisture that can be adsorbed by the hydrocarbon adsorbing catalyst with its present hydrocarbon adsorbing ability, and represents the hydrocarbon adsorbing ability of the hydrocarbon adsorbing catalyst. That is, the integrated amount of moisture up to the adsorption saturation timing is reduced as the hydrocarbon adsorbing ability of the hydrocarbon adsorbing catalyst drops.

According to the first and third aspects of the present invention, a deterioration evaluating parameter representative of the integrated amount of moisture is sequentially generated from the start of operation of the internal combustion engine, and the adsorption saturation timing is detected based on the output data of the humidity sensor. The value of the deterioration evaluating parameter at the detected adsorption saturation timing is compared with a predetermined threshold to evaluate the hydrocarbon adsorbing ability of the hydrocarbon adsorbing catalyst. In this manner, it is possible to appropriately evaluate the hydrocarbon adsorbing ability of the hydrocarbon adsorbing catalyst.

The above threshold should preferably be established depending on the temperature state of the hydrocarbon adsorbing catalyst at the time the internal combustion engine starts to operate.

In the fifth invention for detecting the adsorption saturation timing as described above, the adsorbing ability evaluating means preferably sequentially searches for a state in which the humidity represented by the output data of the humidity sensor takes a minimum value after the internal combustion engine has started to operate, and detects the time when the humidity has increased a predetermined amount or more from a latest minimum value thereof, as the timing at which the humidity represented by the output data of the humidity sensor becomes the monotonously increasing state (sixth invention).

Specifically, the humidity detected by the humidity sensor downstream of the hydrocarbon adsorbing catalyst may vary due to variations of a humidity distribution in the exhaust passage before the internal combustion engine starts to operate. According to the sixth invention, a state in which the humidity detected by the humidity sensor takes a minimum value is sequentially searched for, and the time when the humidity has increased a predetermined amount or more from a latest minimum value (a minimum value finally searched for) thereof is detected as the adsorption saturation timing. In this manner, variations in the humidity before the monotonously increasing state occurs (before the adsorption saturation timing) can be compensated for to detect the adsorption saturation timing adequately. As a consequence, the reliability of the evaluation of the hydrocarbon adsorbing ability of the hydrocarbon adsorbing catalyst based on the deterioration evaluating parameter can be increased.

In the second aspect (the second invention or a combination thereof with the ninth invention) or the fourth aspect (the fourth invention or a combination thereof with the tenth invention) wherein the downstream humidity sensor and the upstream humidity sensor are disposed respectively downstream and upstream of the hydrocarbon adsorbing catalyst, with respect to the evaluation of the hydrocarbon adsorbing ability of the hydrocarbon adsorbing catalyst in particular, the apparatus further comprises first detecting means for detecting a timing at which the humidity represented by the output data of the upstream humidity sensor becomes a monotonously increasing state while sequentially monitoring the output data of the upstream humidity sensor after the internal combustion engine has started to operate, second detecting means for detecting a timing at which the humidity represented by the output data of the downstream humidity sensor becomes a monotonously increasing state while sequentially monitoring the output data of the downstream humidity sensor after the internal combustion engine has started to operate, and means for generating a deterioration evaluating parameter representative of an integrated amount of moisture which is given to the hydrocarbon adsorbing catalyst by the exhaust gas from the timing detected by the first detecting means to the timing detected by the second detecting means, wherein the adsorbing ability evaluating means compares the value of the deterioration evaluating parameter with a predetermined threshold thereby to evaluate the hydrocarbon adsorbing ability of the hydrocarbon adsorbing catalyst (seventh invention).

Specifically, while the internal combustion engine is not operating, the hydrocarbon adsorbent of the hydrocarbon adsorbing catalyst adsorbs a slight amount of ambient moisture. Therefore, the humidity in the vicinity of the hydrocarbon adsorbing catalyst at the time the internal combustion engine starts to operate is relatively low also in a region upstream of the hydrocarbon adsorbing catalyst. Even when the internal combustion engine starts to operate, a slight delay occurs until the exhaust gas containing moisture generated by the internal combustion engine reaches a region near the inlet of the hydrocarbon adsorbing catalyst. Therefore, immediately after the internal combustion engine has started to operate, the humidity upstream of the hydrocarbon adsorbing catalyst (the humidity represented by the output data of the upstream humidity sensor) is at a low humidity level for a relatively short period of time. Thereafter, when the exhaust has which is highly humid reaches the region near the inlet of the hydrocarbon adsorbing catalyst, the humidity upstream of the hydrocarbon adsorbing catalyst changes from the low humidity level to a state in which it increases monotonously to a higher humidity level. The timing at which the humidity upstream of the hydrocarbon adsorbing catalyst becomes a monotonously increasing state may be varied depending on the structure of the exhaust system of the internal combustion engine and the absorption of humidity by the catalytic converter disposed upstream of the hydrocarbon adsorbing catalyst. If the above timing varies, then the timing at which moisture in the exhaust gas starts being substantially adsorbed by the hydrocarbon adsorbent of the hydrocarbon adsorbing catalyst varies. In this case, it is preferable for appropriately evaluating the ability to adsorb moisture of the hydrocarbon adsorbing catalyst and hence the hydrocarbon adsorbing ability thereof, to detect the timing for the hydrocarbon adsorbent of the hydrocarbon adsorbing catalyst to start substantially adsorbing moisture (hereinafter referred to as "adsorption start timing") with the upstream humidity sensor disposed upstream of the hydrocarbon adsorbing catalyst when the humidity upstream of the hydrocarbon adsorbing catalyst becomes the monotonously increasing state, and to acquire, as a deterioration evaluating parameter, data representing an integrated amount of moisture that is given to the hydrocarbon adsorbing catalyst by the exhaust gas from the adsorption start timing thus detected until the adsorption saturation timing when the humidity detected by the downstream humidity sensor becomes the monotonously increasing state.

According to the seventh invention, the second detecting means detects the adsorption saturation timing at which the humidity detected by the downstream humidity sensor becomes the monotonously increasing state, and the first detecting means detects the adsorption start timing at which the humidity detected by the upstream humidity sensor becomes the monotonously increasing state. Then, a deterioration evaluating parameter representative of an integrated amount of moisture which is given to the hydrocarbon adsorbing catalyst by the exhaust gas from the adsorption start timing to the adsorption saturation timing is determined, and the value of the deterioration evaluating parameter is compared with a predetermined threshold thereby to evaluate the hydrocarbon adsorbing ability of the hydrocarbon adsorbing catalyst. With this arrangement, even when the adsorption start timing varies, the reliability of the deterioration evaluating parameter as representing an amount of moisture that can be adsorbed by the hydrocarbon adsorbent of the hydrocarbon adsorbing catalyst is increased. As a result, the hydrocarbon adsorbing ability of the hydrocarbon adsorbing catalyst can adequately be evaluated with greater reliability based on the deterioration evaluating parameter.

In the seventh invention for detecting the adsorption start timing and the adsorption saturation timing, the first detecting means preferably sequentially searches for a state in which the humidity represented by the output data of the upstream humidity sensor takes a minimum value after the internal combustion engine has started to operate, and detects the time when the humidity has increased a first predetermined amount or more from a latest minimum value thereof, as the timing at which the humidity represented by the output data of the upstream humidity sensor becomes the monotonously increasing state, and the second detecting means preferably sequentially searches for a state in which the humidity represented by the output data of the downstream humidity sensor takes a minimum value after the internal combustion engine has started to operate, and detects the time when the humidity has increased a second predetermined amount or more from a latest minimum value thereof, as the timing at which the humidity represented by the output data of the downstream humidity sensor becomes the monotonously increasing state (eighth invention).

As described above with respect to the sixth invention, the humidities detected by the humidity sensors downstream and upstream of the hydrocarbon adsorbing catalyst may vary due to variations of a humidity distribution in the exhaust passage before the internal combustion engine starts to operate. According to the eighth invention, as with the sixth invention, the second detecting means sequentially searches for a state in which the humidity detected by the downstream humidity sensor takes a minimum value, and detects the time when the humidity has increased a second predetermined amount or more from a latest minimum value (a minimum value finally searched for) thereof as the adsorption saturation timing. Similarly, the first detecting means sequentially searches for a state in which the humidity detected by the upstream humidity sensor takes a minimum value, and detects the time when the humidity has increased a first predetermined amount or more from a latest minimum value (a minimum value finally searched for) thereof as the adsorption start timing. Variations in the humidity downstream of the hydrocarbon adsorbing catalyst prior to the adsorption saturation timing and variations in the humidity upstream of the hydrocarbon adsorbing catalyst prior to the adsorption start timing can thus be compensated for to appropriately detect the adsorption saturation timing and the adsorption start timing. As a result, the reliability of the evaluation of the hydrocarbon adsorbing ability of the hydrocarbon adsorbing catalyst based on the deterioration evaluating parameter which represents an integrated amount of moisture between these timings is increased.

In the first and second aspects of the present invention, the unburned gas purifying ability of the exhaust gas purifier may be evaluated using the output data of the air-fuel ratio sensor, as with the conventional technique for evaluating the deteriorated state of the catalytic converter itself. In any of the first through tenth inventions, it is preferable to employ the technique disclosed in PCT international publication WO/01/46569/A1 by the applicant of the present application, for example.

In the first and second aspects of the present invention, the apparatus has means for controlling the air-fuel ratio of an air-fuel mixture to be combusted by the internal combustion engine for converting the output of the air-fuel ratio sensor disposed downstream of the hydrocarbon adsorbing catalyst to a predetermined target value after the internal combustion engine has started to operate. While the air-fuel ratio is being controlled, the purifying ability evaluating means determines a variation extent parameter representing a variation extent of a predetermined evaluating linear function which has variable components represented by a plurality of time-series data of the output of the air-fuel ratio sensor, and compares the variation extent parameter with a predetermined threshold to evaluate the unburned gas purifying ability of the hydrocarbon adsorbing catalyst.

In the third and fourth aspects of the present invention, the apparatus has means for controlling the air-fuel ratio of an air-fuel mixture to be combusted by the internal combustion engine for converting the output of the air-fuel ratio sensor disposed downstream of the exhaust gas purifier to a predetermined target value after the internal combustion engine has started to operate. While the air-fuel ratio is being controlled, the purifying ability evaluating means determines a variation extent parameter representing a variation extent of a predetermined evaluating linear function which has variable components represented by a plurality of time-series data of the output of the air-fuel ratio sensor, and compares the variation extent parameter with a predetermined threshold to evaluate the overall unburned gas purifying ability of the exhaust gas purifier.

BRIEF DESCRIPTION OF THE DRAWINGS

FIG. 2 is a diagram showing output characteristics of a humidity sensor used in the apparatus shown in FIG. 1.

FIG. 3 is a diagram showing output characteristics of an air-fuel ratio sensor used in the apparatus shown in FIG. 1.

FIG. 4 is a flowchart of a processing sequence of a deterioration evaluating device in the apparatus shown in FIG. 1.

BEST MODE FOR CARRYING OUT THE INVENTION

A first embodiment of the present invention will be described with reference to FIGS. 1 through 8. The present embodiment is an embodiment according to the first aspect of the present invention.

Figure 1:
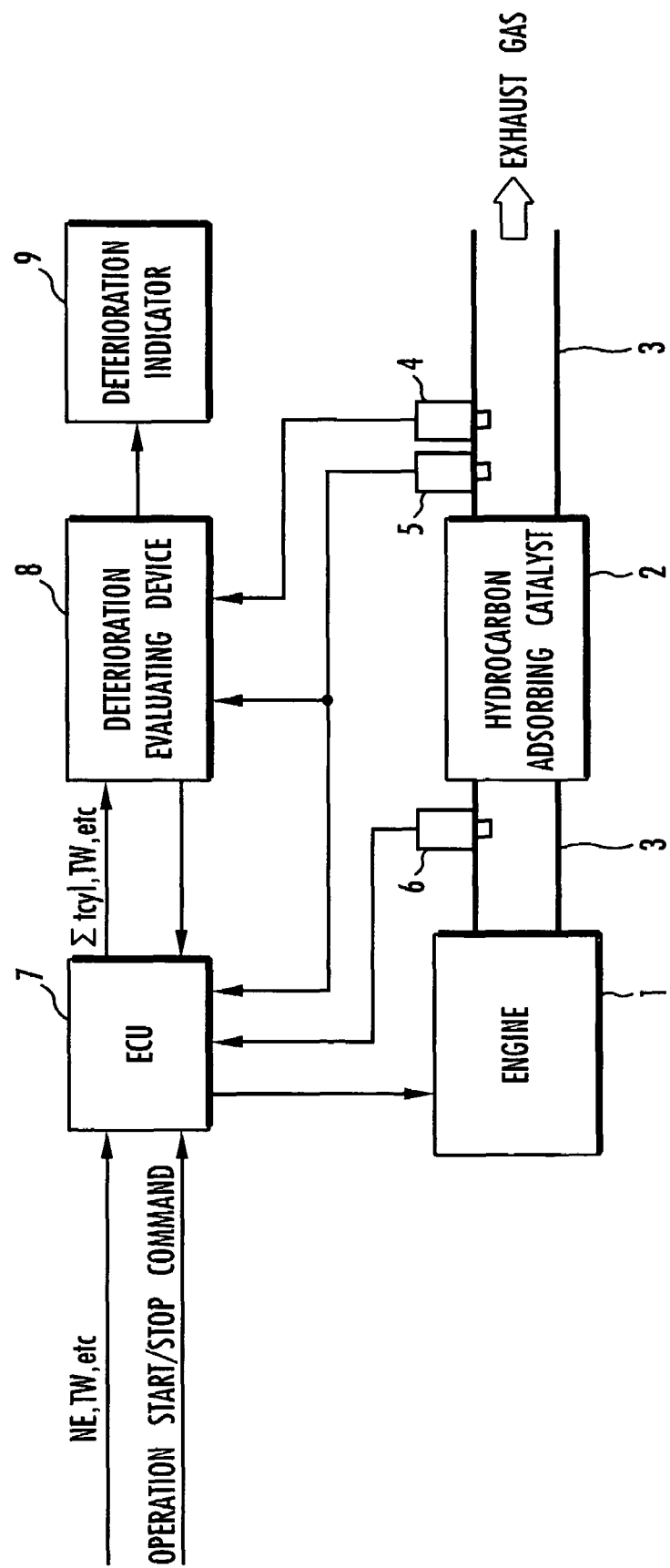
FIG. 1 is a block diagram of an overall system arrangement of an apparatus according to a first embodiment of the present invention.

FIG. 1 is a block diagram of an overall system arrangement of an apparatus according to a first embodiment of the present invention. Denoted by 1 in FIG. 1 is an engine (internal combustion engine) mounted on an automobile or a hybrid vehicle. An exhaust gas produced by the engine 1 when a mixture of fuel and air is combusted is discharged from through an exhaust gas passage 3 having a hydrocarbon adsorbing catalyst 2 (hereinafter referred to as "HC adsorbing catalyst 2") which serves as an exhaust gas purifier according to the present invention. The HC adsorbing catalyst 2 comprises, though not shown in detail, a carrier of honeycomb structure which is coated with a hydrocarbon adsorbent of zeolite or like and which carries a precious metal such as platinum, palladium, rhodium, or the like as a constituent material of a three-way catalyst.

The exhaust passage 3 has, disposed downstream of the HC adsorbing catalyst 2, a humidity sensor 4 and an oxygen concentration sensor ($O_2$ sensor) 5 as an air-fuel ratio sensor. The humidity sensor 4 generates an output depending on the humidity (more specifically, relative humidity) of the exhaust gas that has passed through the HC adsorbing catalyst 2. The $O_2$ sensor 5 generates an output depending on the oxygen concentration in the exhaust gas that has passed through the HC adsorbing catalyst 2.

As shown in FIG. 2, for example, the humidity sensor 4 in the present embodiment is a sensor having such output characteristics that the output voltage thereof decreases substantially linearly as the humidity (relative humidity) increases.

Since the oxygen concentration in the exhaust gas that is detected by the $O_2$ sensor 5 depends on the air-fuel ratio of the air-fuel mixture combusted by the engine 1, the output of the $O_2$ sensor 5 depends on the air-fuel ratio of the exhaust gas (specifically, the air-fuel ratio of the air-fuel mixture from which the exhaust gas is produced by combustion). As indicated by the solid-line curve "a" in FIG. 3, for example, the output of the $O_2$ sensor 5 changes depending on the air-fuel ratio of the exhaust gas when the air-fuel ratio of the exhaust gas is in a relatively narrow air-fuel ratio range Δ near the stoichiometric air-fuel ratio.

The exhaust passage 3 also has a wide-range air-fuel ratio sensor 6 disposed upstream of the HC adsorbing catalyst 2. The wide-range air-fuel ratio sensor 6 is an air-fuel ratio sensor that is described in detail in Japanese laid-open patent publication No. 4-369471 or U.S. Pat. No. 5,391,282 by the applicant of the present application. The wide-range air-fuel ratio sensor 6 is a sensor having an output level which changes substantially linearly depending on the air-fuel ratio of the exhaust gas over a wider air-fuel ratio range than the $O_2$ sensor 5, as indicated by the solid-line curve "b" in FIG. 3 (the wide-range air-fuel ratio sensor 6 will hereinafter be referred to as "LAF sensor 6").

The apparatus according to the present embodiment also has, in addition to the above structure, a controller 7 (hereinafter referred to as "ECU 7") for controlling operation of the engine 1, a deterioration evaluating device 8 for executing a processing sequence to evaluate a deteriorated state of the HC adsorbing catalyst 2, and a deterioration indicator 9 for indicating the deteriorated state as evaluated. The ECU 7 and the deterioration evaluating device 8 are implemented by a microcomputer or the like. The deterioration indicator 9 comprises a lamp, a buzzer, or a display unit for displaying characters, a graphic image, etc.

The ECU 7 is supplied with outputs from the $O_2$ sensor 5 and the LAF sensor 6, with detected data of the rotational speed NE of the engine 1, the engine temperature TW thereof (specifically, the temperature of the coolant of the engine 1), etc. from non-illustrated sensors, and also with an operation start command signal and an operation stop command signal for the engine 1 from a non-illustrated operation switch. The ECU 7 then controls operation of the engine 1 (controls the air-fuel ratio, etc.) based on the detected data and the command signals that are supplied thereto, according to a predetermined control program. Specifically, the ECU 7 controls a throttle valve mechanism, a fuel injector, an ignition device, a starter motor, etc., not shown, to control operation of the engine 1.

The ECU 7 performs a processing sequence in relation to the evaluation of the deteriorated state of the HC adsorbing catalyst 2. According to such a processing sequence, the ECU 7 controls the air-fuel ratio of an air-fuel mixture to be combusted by the engine 1 in order to converge the output of the $O_2$ sensor 5 to a predetermined target value using the output data of the $O_2$ sensor 5 and the LAF sensor 6 during ordinary operation of the engine 1. The air-fuel ratio control process serves to provide an optimum capability for purifying unburned gases (HC, CO, NOx, etc.) based on a catalytic action (oxidizing and reducing reactions) of the HC adsorbing catalyst 2. Details of the air-fuel ratio control process will not be described below as they are disclosed in PCT international publication WO/01/46569/A1, etc. by the applicant of the present application. A summary of the air-fuel ratio control process is as follows: A target air-fuel ratio for the exhaust gas in the location of the LAF sensor 6 is successively generated in order to converge the output of the $O_2$ sensor 5 to a predetermined target value according to a sliding mode control process based on the output data of the $O_2$ sensor 5 and the LAF sensor 6 and a predetermined model of the exhaust system. The quantity of fuel to be injected into the engine 1 is adjusted by an adaptive control process for converting the output of the LAF sensor 6 (the detected value of the air-fuel ratio) to the target air-fuel ratio.

The ECU 7 also has a function as a means for sequentially determining a deterioration evaluating parameter according to the present invention. The ECU 7 executes a process of sequentially determining an integrated value that is produced by sequentially integrating (accumulatively adding), from the start of operation of the engine 1, a command value for the quantity of fuel to be injected into the engine 1, which is sequentially generated by the ECU 7 in synchronism with a so-called TDC signal, i.e., a timing synchronous with the rotational speed of the engine 1, as a deterioration evaluating parameter representative of an integrated amount of moisture that has been given by the exhaust gas to the HC adsorbing catalyst 2 from the start of operation of the engine 1. Specifically, there is an essentially constant correlation between the quantity of fuel supplied to the engine 1 and the amount of moisture contained in the exhaust gas that is emitted from the engine 1 when the mixture of the supplied fuel and air is combusted. The integrated amount of moisture that is carried by the exhaust gas to the HC adsorbing catalyst 2 after the engine 1 has started to operate depends on the integrated value of the command value for the quantity of fuel to be injected. According to the present embodiment, therefore, the integrated value of the command value for the quantity of fuel to be injected (hereinafter referred to as "integrated fuel injection quantity Σtcyl") is regarded as a deterioration evaluating parameter and calculated by the ECU 7. The deterioration evaluating parameter representative of the integrated amount of moisture is not limited to the integrated value of the command value for the fuel to be injected, but may be an integrated value of a detected or estimated value of the amount of intake air supplied to the engine 1. Furthermore while the engine 1 is idling, a period of time that has elapsed from the time when the engine 1 has started to operate may be used as a deterioration evaluating parameter representing the integrated amount of moisture.

The deterioration evaluating device 8 is supplied with output data from the humidity sensor 4 and the $O_2$ sensor 5, data of the integrated fuel injection quantity Σtcyl from the ECU 7, and detected data of the engine temperature TW of the engine 1 from the ECU 7. The deterioration evaluating device 8 evaluates a deteriorated state (adsorbing ability) of the HC adsorbing catalyst 2 based on the supplied data according to a predetermined program, as described later on. The deterioration evaluating device 8 evaluates a deteriorated state of the HC adsorbing catalyst 2 as either a state where it has been deteriorated to the extent that it needs to be replaced (such a deteriorated state will hereinafter be referred to as "deterioration-in-progress state") or a state where it has not been deteriorated to the deterioration-in-progress state (such a state will hereinafter be referred to as "non-deteriorated state"). When the deterioration evaluating device 8 judges that the deteriorated state of the HC adsorbing catalyst 2 is the deterioration-in-progress state, the deterioration evaluating device 8 controls the deterioration indicator 9 to indicate the deteriorated state as thus evaluated. The deterioration evaluating device 8 and the ECU 7 are capable of exchanging the above data (the integrated fuel injection quantity Σtcyl, etc.) and also various other data with each other. The deterioration evaluating device 8 has a function as an adsorbing ability evaluating means and a purifying ability evaluating means.

Operation of the apparatus according to the present embodiment, particularly for evaluating a deteriorated state of the HC adsorbing catalyst 2, will be described in detail below.

When the operation switch (not shown) is turned on to start operation of the engine 1, the ECU 7 and the deterioration evaluating device 8 are activated. The ECU 7 controls a starter motor (not shown) to rotate the crankshaft (not shown) of the engine 1. The ECU 7 controls the fuel injector (not shown) to supply the fuel to the engine 1, and controls the igniter (not shown) to start operating the engine 1. From the time when the fuel injector starts to supply the fuel to the engine 1, the ECU 7 sequentially calculates an integrated fuel injection quantity $\Sigma$tcyl. After the engine 1 has started to operate, and after certain conditions for activating the $O_2$ sensor 5 and the LAF sensor 6 are satisfied, the ECU 7 controls the air-fuel ratio of the engine 1 in order to converge the output of the $O_2$ sensor 5 to a predetermined target value, as described later on.

When the engine 1 starts operating, it emits an exhaust gas that flows through the HC adsorbing catalyst 2. At this time, the HC adsorbent of the adsorbing catalyst 2 adsorbs HCs contained in the exhaust gas. Therefore, even while the catalytic function of the HC adsorbing catalyst 2 is not sufficiently activated as when the engine 1 starts to operate at a low temperature, the HCs are prevented from being discharged into the atmosphere. The HC adsorbent of the HC adsorbing catalyst 2 adsorbs moisture in the exhaust gas as well as the HCs in the exhaust gas.

After the deterioration evaluating device 8 is activated, it performs a processing sequence shown in FIG. 4. The processing sequence shown in FIG. 4 is performed only when the engine 1 starts operating.

First, the deterioration evaluating device 8 acquires from the ECU 7 detected data representative of the engine temperature TW (hereinafter referred to as "initial engine temperature TW") of the engine 1 at the start of operation of the engine 1 as data representative of the temperature of the HC adsorbing catalyst 2 at the start of operation of the engine 1 in STEP1. If the apparatus has a temperature sensor for detecting the temperature of the HC adsorbing catalyst 2 or a nearby region, then the deterioration evaluating device 8 may acquire the above data from the temperature sensor.

Thereafter, the deterioration evaluating device 8 determines whether the initial engine temperature TW is in a predetermined range (TWL$\leq$TW$\leq$THW) or not in STEP2. If the initial engine temperature TW is not in the above predetermined range, then the deterioration evaluating device 8 sets a flag F/MCND to "0" in STEP3 in order to inhibit an evaluation (described later on) of the deteriorated state of the HC adsorbing catalyst 2, and then puts the processing sequence shown in FIG. 4 to an end. This is because the HC adsorbing ability of the HC adsorbing catalyst 2 cannot adequately be evaluated if the temperature of the HC adsorbing catalyst 2 is excessively low (e.g., 0° C. or lower) or if the temperature of the HC adsorbing catalyst 2 is excessively high (e.g., 50° C. or higher).

If the initial engine temperature TW is in the predetermined range in STEP2, then the deterioration evaluating device 8 sets the flag F/MCND to "1" in STEP4 in order to carry out a process of evaluating the deteriorated state of the HC adsorbing catalyst 2. Thereafter, the deterioration evaluating device 8 acquires present data of the output voltage VRST of the humidity sensor 4 in STEP5, and determines a relative humidity VHUMD0 corresponding to the output voltage VRST as an initial relative humidity at the start of operation of the engine 1 in STEP6. The initial relative humidity VHUMD0 is determined from the value of the output voltage VRST acquired in STEP5 based on a data table or a formula representative of the output characteristics of the humidity sensor 4 shown in FIG. 2.

The deterioration evaluating device 8 then stores the value of the initial relative humidity VHUMD0 as the value of a parameter VHUMD/MIN (hereinafter referred to as "minimum humidity parameter VHUMD/MIN") representative of the latest value of a minimum value of a humidity (relative humidity) in the location of the humidity sensor 4 downstream of the HC adsorbing catalyst 2, and the value of a parameter VHUMD/PRE (hereinafter referred to as "preceding relative humidity parameter VHUMD/PRE") representative of a preceding value (a preceding value in each cycle time of the processing sequence of the deterioration evaluating device 8) of the relative humidity in STEP7. That is, the deterioration evaluating device 8 initializes the values of these parameters VHUMD/MIN, VHUMD/PRE with the value of the initial relative humidity VHUMD0 as the humidity (relative humidity) upstream of the HC adsorbing catalyst 2 at the time the engine 1 starts to operate.

Figure 5:
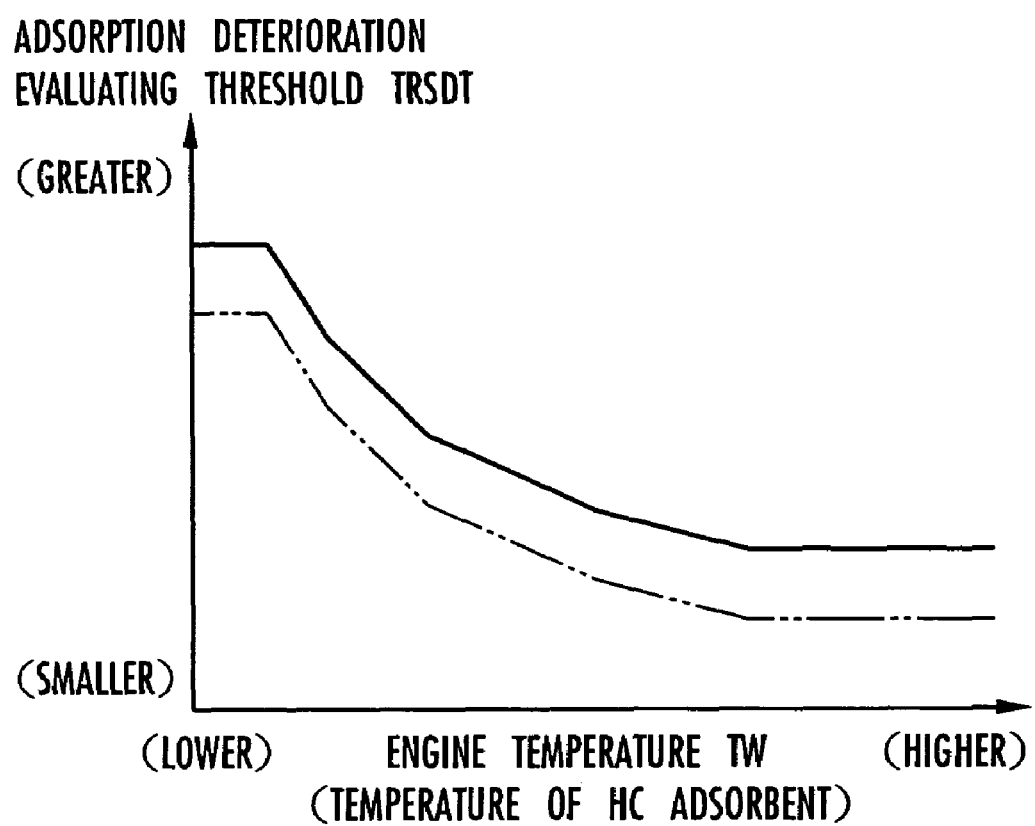
FIG. 5 is a diagram showing a data table used in the flowchart of FIG. 4.

Then, the deterioration evaluating device 8 determines an adsorption deterioration evaluating threshold TRSDT with which to determine whether the HC adsorbing catalyst 2 is in the deterioration-in-progress state or the non-deteriorated state from the detected data of the initial engine temperature TW acquired in STEP1 according to a predetermined data table as indicated by the solid-line curve in FIG. 5 in STEP8. Thereafter, the processing sequence shown in FIG. 4 is put to an end.

The lower the initial temperature of the HC adsorbent of the HC adsorbing catalyst 2, the greater the maximum amount of moisture and hence the maximum amount of HCs that can be adsorbed by the HC adsorbing catalyst 2. Therefore, according to the data table as indicated by the solid-line curve in FIG. 5, the adsorption deterioration evaluating threshold TRSDT is basically determined such that it has a greater value as the initial engine temperature TW at the time the engine 1 starts to operate is lower. The adsorption deterioration evaluating threshold TRSDT corresponds to the maximum amount of moisture that can be adsorbed by the HC adsorbent of the HC adsorbing catalyst 2 (which corresponds to the maximum amount of HCs that can be adsorbed) when the HC adsorbing ability of the HC adsorbing catalyst 2 is of a limit value where the deteriorated state of the HC adsorbing catalyst 2 is judged as the non-deteriorated state (a state immediately before the deteriorated state of the HC adsorbing catalyst 2 is judged as the deterioration-in-progress state). The adsorption deterioration evaluating threshold TRSDT is determined by way of experimentation or the like. In the present embodiment, an integrated fuel injection quantity is used instead of an actual amount of moisture. A data table as indicated by the imaginary-line curve in FIG. 5 will be referred to later in the description of a third embodiment of the present invention.

Figure 6:
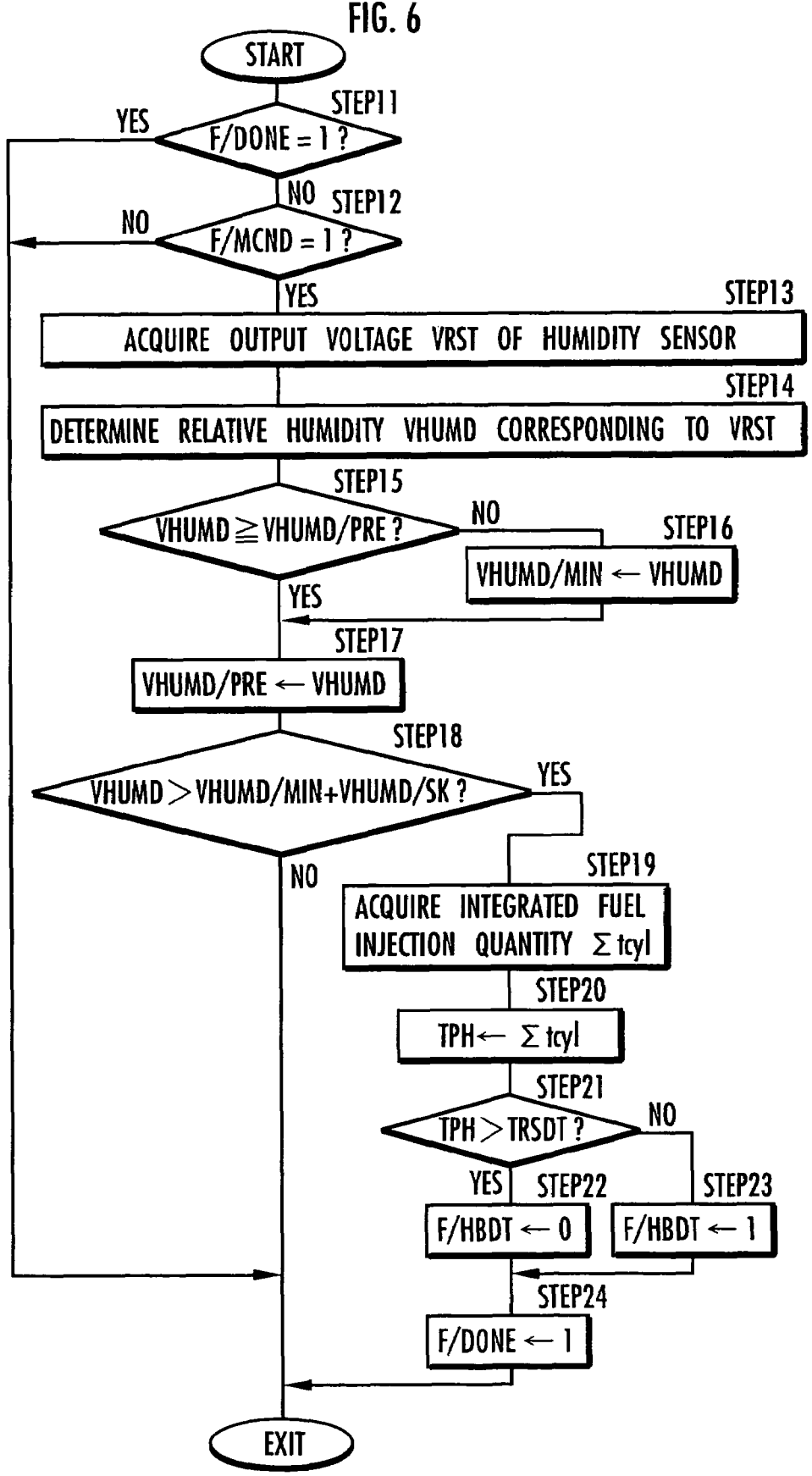
FIG. 6 is a flowchart of a processing sequence of the deterioration evaluating device in the apparatus shown in FIG. 1.

After having performed the processing sequence shown in FIG. 4 at the time the engine 1 starts to operate, the deterioration evaluating device 8 performs a processing sequence shown in FIG. 6 in a predetermined cycle time.

The deterioration evaluating device 8 determines the value of a flag F/DONE in STEP11. When the value of the flag F/DONE is "1", then it indicates that the evaluation of the deteriorated state of the HC adsorbing catalyst 2 is completed, and when the value of the flag F/DONE is "0", then it indicates that the evaluation of the HC adsorbing catalyst 2 is not completed. Each time the engine 1 starts to operate, the value of the flag F/DONE is initialized to "0". If F/DONE=1, then since the evaluation of the HC adsorbing ability of the HC adsorbing catalyst 2 is completed, the processing sequence shown in FIG. 6 is put to an end.

If F/DONE=0, then the deterioration evaluating device 8 determines the value of a flag F/MCND in STEP12. If F/MCND=0, then it means that the initial temperature of the HC adsorbing catalyst 2 is in a temperature state not suitable for evaluating the HC adsorbing ability thereof. Since the deterioration evaluating device 8 is unable to evaluate the HC adsorbing ability, it puts the processing sequence shown in FIG. 6 to an end.

If F/MCND=1 in STEP12, then the deterioration evaluating device 8 acquires the present data of the output voltage VRST of the humidity sensor 4 in STEP13, and determines a present relative humidity VHUMD corresponding to the output voltage VRST in STEP14. The relative humidity VHUMD can be determined from the value of the output voltage VRST acquired in STEP13 based on a data table or a formula representative of the output characteristics of the humidity sensor 4 shown in FIG. 2.

Then, the deterioration evaluating device 8 compares the value of the relative humidity VHUMD and the preceding relative humidity parameter VHUMD/PRE with each other in STEP15. If VHUMD≧VHUMD/PRE (if the relative humidity VHUMD is increasing), then the deterioration evaluating device 8 updates the value of the preceding relative humidity parameter VHUMD/PRE with the present value of the relative humidity VHUMD determined in STEP14 in STEP17. If VHUMD<VHUMD/PRE (If the relative humidity VHUMD is decreasing), then the deterioration evaluating device 8 updates the value of the minimum humidity parameter VHUMD/MIN with the present value of the relative humidity VHUMD in STEP16. Thereafter, the deterioration evaluating device 8 performs the processing in STEP17 to update the value of the preceding relative humidity parameter VHUMD/PRE.

According to the processing in STEP13 through STEP17, therefore, while the relative humidity VHUMD detected by the humidity sensor 4 is decreasing, the value of the minimum humidity parameter VHUMD/MIN is updated in each cycle time of the processing sequence of the deterioration evaluating device 8. While the relative humidity VHUMD is increasing, the value of the minimum humidity parameter VHUMD/MIN is not updated, but held to the minimum value of the relative humidity VHUMD (latest minimum value) immediately before the relative humidity VHUMD starts increasing.

After the processing in STEP17, the deterioration evaluating device 8 compares the present value of the relative humidity VHUMD with a value (=VHUMD/MIN+VHUMD/SK, hereinafter referred to as "increase judgement threshold") which is the sum of the present value of the minimum humidity parameter VHUMD/MIN (the latest minimum value of the relative humidity VHUMD) and a predetermined quantity VHUMD/SK (see FIG. 7) in STEP18, in order to determine whether the relative humidity VHUMD is monotonously increasing.

Figure 7:
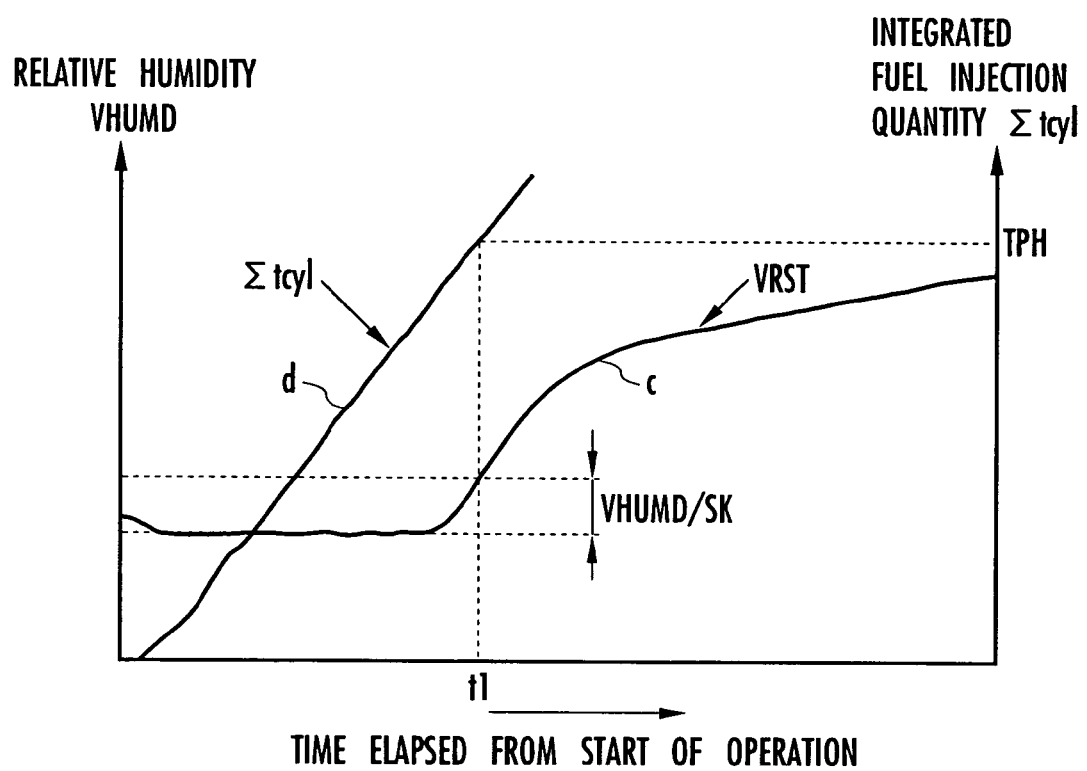
FIG. 7 is a diagram illustrative of the processing sequence of the flowchart of FIG. 6.

As shown in FIG. 7, immediately after the engine 1 has started to operate, the relative humidity VHUMD based on the output voltage VRST of the humidity sensor 4 is of a substantially constant low-humidity level because moisture and HCs in the exhaust gas are adsorbed by the HC adsorbent of the HC adsorbing catalyst 2 as is shown by the solid-line curve c. Thereafter, as the exhaust gas containing moisture due to the saturation of the adsorption of moisture by the HC adsorbent passes through the HC adsorbing catalyst 2, the relative humidity VHUMD changes to a state in which it monotonously increases from the low-humidity level to a high-humidity level. According to the present embodiment, the time (t1 in FIG. 7) when the relative humidity VHUMD exceeds an increase judgement threshold (=VHUMD/MIN+VHUMD/SK) which is the sum of the latest minimum value VHUMD/MIN and a predetermined quantity VHUMD/SK is detected as a timing when the adsorption of moisture by the HC adsorbent of the HC adsorbing catalyst 2 is saturated, i.e., an adsorption saturation timing when the adsorption of HCs by the HC adsorbent is saturated.

STEP18 referred to above is a decision process for detecting the adsorption saturation timing. If the present value of the relative humidity VHUMD is not in excess of the increase judgement threshold (during a period prior to a time t1 in FIG. 7), the deterioration evaluating device 8 puts the processing sequence shown in FIG. 6 to an end in the present cycle time.

If VHUMD>the increase judgement threshold in STEP18, then deterioration evaluating device 8 judges that the time (t1 in FIG. 7) in the present cycle time is the adsorption saturation timing, and acquires the data of the present value of the integrated fuel injection quantity Σtcyl from the ECU 7 in STEP19, and stores the value of the integrated fuel injection quantity Σtcyl as a deterioration evaluating parameter TPH at the adsorption saturation timing of the HC adsorbent of the HC adsorbing catalyst 2 in STEP20. For example, in FIG. 7, the integrated fuel injection quantity Σtcyl at the time t1 is stored as a deterioration evaluating parameter TPH at the adsorption saturation timing.

Then, the deterioration evaluating device 8 compares the value of the deterioration evaluating parameter TPH with an adsorption deterioration evaluating threshold TRSDT determined in STEP8 shown in FIG. 4 at the time the engine 1 has started to operate, in STEP21. If TPH>TRSDT, then since the HC adsorbent of the HC adsorbing catalyst 2 is in a state capable of sufficiently adsorbing moisture and hence HCs in the exhaust gas, the deterioration evaluating device 8 judges that the HC adsorbing ability of the HC adsorbing catalyst 2 is good, and sets the value of a flag F/HBDT to "0" in STEP22. When the value of the flag F/HBDT is "0", then it indicates that the HC adsorbing ability of the HC adsorbing catalyst 2 is good, and when the value of the flag F/HBDT is "1", then it indicates that the HC adsorbing ability of the HC adsorbing catalyst 2 is not good. The deterioration evaluating device 8 determines that the process of evaluating the HC adsorbing ability of the HC adsorbing catalyst 2 has been completed, and sets the value of the flag F/DONE to "1" in STEP24. Thereafter, the deterioration evaluating device 8 puts the processing sequence shown in FIG. 6 to an end.

If TPH≦TRSDT in STEP21, then since the amount of water and hence HCs in the exhaust gas that can be adsorbed by the HC adsorbent of the HC adsorbing catalyst 2 is small, the deterioration evaluating device 8 judges that the HC adsorbing ability of the HC adsorbing catalyst 2 is deteriorated, and sets the value of the flag F/HBDT to "1" in STEP23. Then, the deterioration evaluating device 8 sets the value of the flag F/DONE to "1" in STEP24. Thereafter, the deterioration evaluating device 8 puts the processing sequence shown in FIG. 6 to an end. According to the processing sequence shown in FIG. 6, as described above, the HC adsorbing ability of the HC adsorbing catalyst 2 is evaluated, and the value of the flag F/HBDT is set depending on whether the HC adsorbing ability of the HC adsorbing catalyst 2 is good or not.

Figure 8:
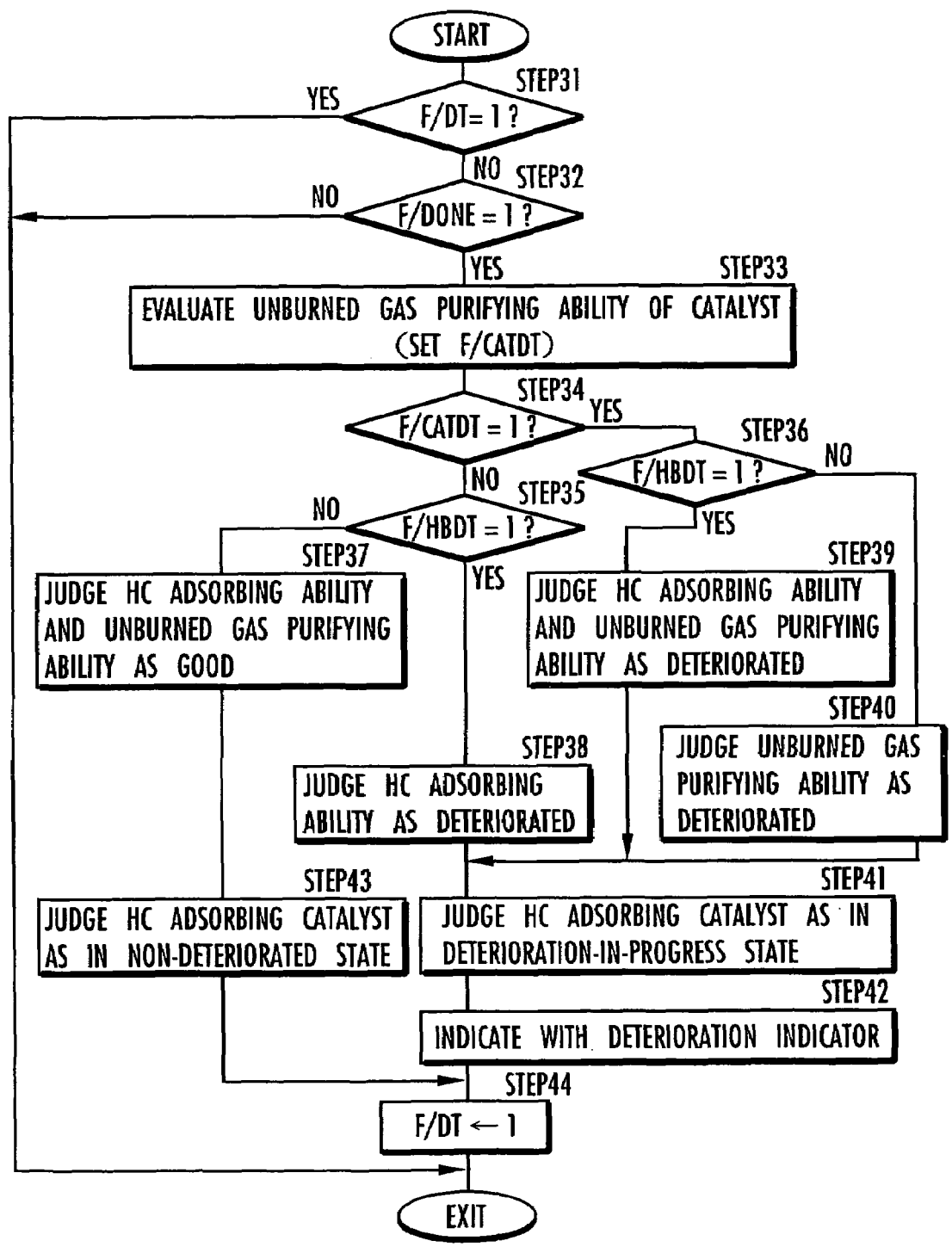
FIG. 8 is a flowchart of a processing sequence of the deterioration evaluating device in the apparatus shown in FIG. 1.

While the ECU 7 is controlling the air-fuel ratio of the engine 1 to converge the output of the $O_2$ sensor 5 to a predetermined target value as described above, the deterioration evaluating device 8 performs a processing sequence shown in FIG. 8 to evaluate the unburned gas purifying ability based on a catalytic action of the HC adsorbing catalyst 2 for thereby evaluating the overall deteriorated state including the HC adsorbing ability and the unburned gas purifying ability of the HC adsorbing catalyst 2.

According to the processing sequence shown in FIG. 8, the deterioration evaluating device 8 determines the value of a flag F/DT in STEP31. When the value of the flag F/DT is "1", it indicates that the evaluation of the overall deteriorated state of the HC adsorbing catalyst 2 is completed, and when the value of the flag F/DT is "0", it indicates that the evaluation of the overall deteriorated state of the HC adsorbing catalyst 2 is not completed. The value of the flag F/DT is initialized to "0" when the engine 1 starts to operate.

If F/DT=1, then since the evaluation of the overall deteriorated state of the HC adsorbing catalyst 2 is completed, the deterioration evaluating device 8 immediately puts the processing sequence shown in FIG. 8 to an end. If F/DT=0, then the deterioration evaluating device 8 determines the value of the flag F/DONE in STEP32. If F/DONE=0, then since the evaluation of the HC adsorbing ability of the HC adsorbing catalyst 2 is not completed or the initial engine temperature TW of the engine 1 does not satisfy the condition of STEP2 shown in FIG. 4 and the HC adsorbing ability cannot be evaluated, the deterioration evaluating device 8 does not evaluate the overall deteriorated state of the HC adsorbing catalyst 2, and puts the processing sequence shown in FIG. 8 to an end.

If F/DONE=1 (the evaluation of the HC adsorbing ability of the HC adsorbing catalyst 2 is normally completed) in STEP 32, then the deterioration evaluating device 8 evaluates the unburned gas purifying ability based on the catalytic action of the HC adsorbing catalyst 2 using the output data of the $O_2$ sensor 6, and sets the value of a flag F/CATDT in STEP33. The value of the flag F/CATDT is set to "1" when the unburned gas purifying ability is good, and set to "0" when the unburned gas purifying ability is not good. The process of evaluating the unburned gas purifying ability of the HC adsorbing catalyst 2 in STEP33 employs the technique described in detail in PCT international publication WO/01/46569/A1 by the applicant of the present application, and will not be described in detail below. A summary of the process is as follows:

The square of the value of a predetermined evaluating linear function (a function corresponding to a switching function for a sliding mode control process for controlling the air-fuel ratio of the engine 1) which has variable components represented by time-series data (e.g., a present value and a past value in a preceding control cycle) of the output of the $O_2$ sensor 6 is sequentially determined, and the central value of the least square of the square value of the evaluating linear function is determined as a parameter for evaluating the unburned gas purifying ability based on the catalytic action of the HC adsorbing catalyst 2 according to a sequential statistical algorithm (e.g., a sequential least square method or a sequential weighted least square method). The value of the parameter thus determined (the central value of the least square of the square value of the evaluating linear function) represents the degree of variations of the value of the evaluating linear function. The value of the parameter (the degree of variations of the value of the evaluating linear function) is greater as the unburned gas purifying ability based on the catalytic action of the HC adsorbing catalyst 2 is lower. By comparing the value of the parameter with a predetermined threshold value, it can be determined whether the unburned gas purifying ability of the HC adsorbing catalyst 2 is good or not, and the value of the flag F/CATDT is set accordingly.

After having evaluated the unburned gas purifying ability of the HC adsorbing catalyst 2, the deterioration evaluating device 8 determines the HC adsorbing ability and the unburned gas purifying ability of the HC adsorbing catalyst 2 based on the values of the flags F/CATDT, F/HBDT in STEP34 through STEP40. Specifically, if F/CATDT=0 and F/HBDT=0, then both the HC adsorbing ability and the unburned gas purifying ability of the HC adsorbing catalyst 2 are judged as being good in STEP37. If F/CATDT=0 and F/HBDT=1, then the HC adsorbing ability of the HC adsorbing catalyst 2 is judged as being deteriorated in STEP38. If F/CATDT=1 and F/HBDT=1, then both the HC adsorbing ability and the unburned gas purifying ability of the HC adsorbing catalyst 2 are judged as being deteriorated in STEP39. If F/CATDT=1 and F/HBDT=0, then the unburned gas purifying ability of the HC adsorbing catalyst 2 is judged as being deteriorated in STEP40.

If at least one of the HC adsorbing ability and the unburned gas purifying ability of the HC adsorbing catalyst 2 is judged as being deteriorated in one of STEP38 through STEP40, then the deterioration evaluating device 8 judges that the overall (general) deteriorated state of the HC adsorbing catalyst 2 is the deterioration-in-progress state in STEP41, and controls the deterioration indicator 9 to indicate the deteriorated state as thus evaluated in STEP42. The deterioration evaluating device 8 sets the value of the flag F/DT to "1" indicating that the evaluation of the overall deteriorated state of the HC adsorbing catalyst 2 is completed in STEP44, and puts the processing sequence shown in FIG. 8 to an end.

If both the HC adsorbing ability and the unburned gas purifying ability of the HC adsorbing catalyst 2 are judged as being good in STEP37, then the deterioration evaluating device 8 judges that the overall (general) deteriorated state of the HC adsorbing catalyst 2 is the non-deteriorated state in STEP43. The deterioration evaluating device 8 does not energize the deterioration indicator 9, but sets the value of the flag F/DT to "1" in STEP 44 and puts the processing sequence shown in FIG. 8 to an end.

According to the above process of the deterioration evaluating device 8, the HC adsorbing ability of the HC adsorbent of the HC adsorbing catalyst 2 and the unburned gas purifying ability based on the catalytic action of the HC adsorbing catalyst 2, which is the exhaust gas purifier in the present embodiment, are evaluated. If either one of the HC adsorbing ability and the unburned gas purifying ability of the HC adsorbing catalyst 2 is judged as being deteriorated, the overall deteriorated state of the HC adsorbing catalyst 2 is judged as the deterioration-in-progress state. Therefore, it is not judged that the HC adsorbing catalyst 2 is in the non-deteriorated state when either one of the HC adsorbing ability and the unburned gas purifying ability of the HC adsorbing catalyst 2 is deteriorated, so that the overall deteriorated state of the HC adsorbing catalyst 2 can adequately be evaluated. Particularly, for evaluating the HC adsorbing ability of the HC adsorbing catalyst 2, the output data of the humidity sensor 4 disposed downstream of the HC adsorbing catalyst 2 is employed to grasp the adsorption saturation timing with accuracy. Consequently, the HC adsorbing ability can be evaluated accurately at a relatively low cost based on the deterioration evaluating parameter TPH that represents the integrated amount of moisture which is supplied to the HC adsorbing catalyst 2 until the adsorption saturation timing.

A second embodiment of the present invention will be described below with reference to FIG. 9. The present embodiment is an embodiment according to the third aspect of the present invention. Those parts and functions of the present embodiment which are identical to those of the first embodiment are denoted by identical reference characters, and will not be described in detail below.

Figure 9:
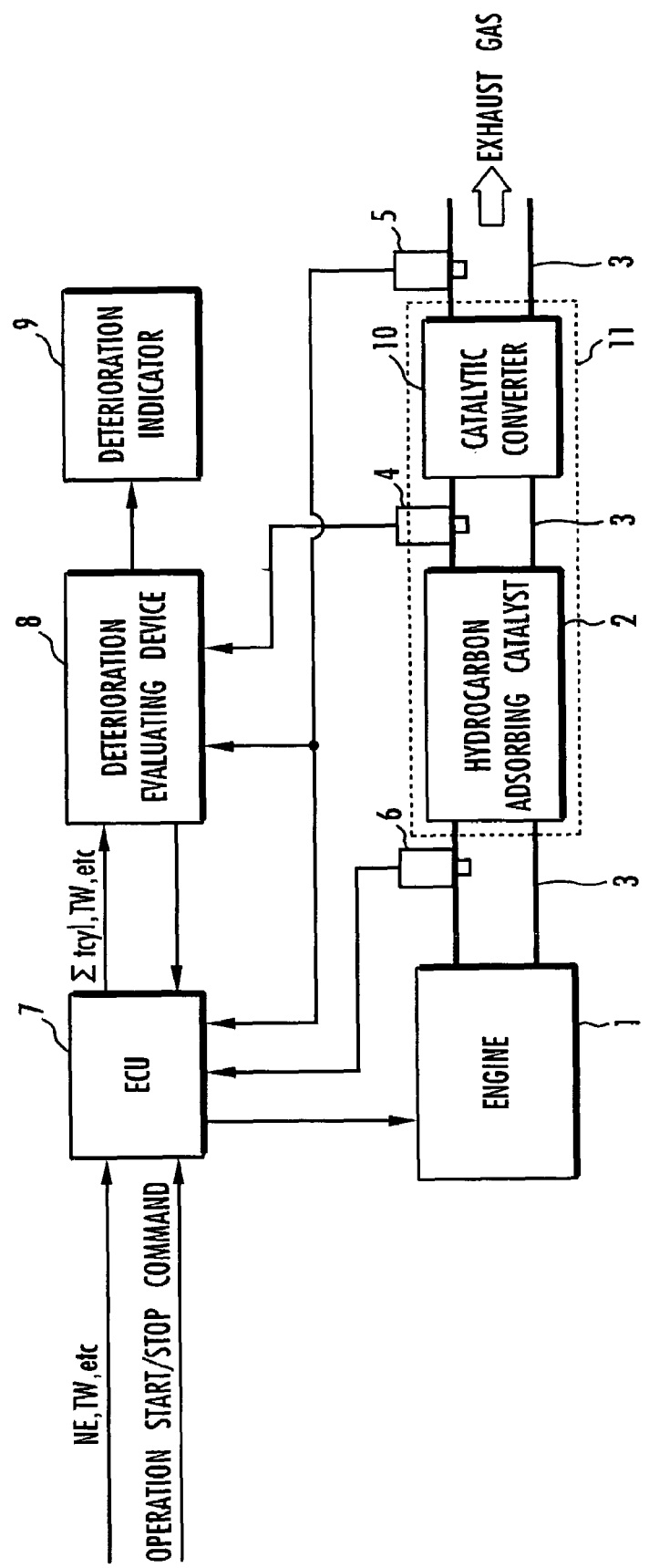
FIG. 9 is a block diagram of an overall system arrangement of an apparatus according to a second embodiment of the present invention.

As shown in FIG. 9, an apparatus according to the present embodiment has an exhaust gas purifier 11 disposed in the exhaust passage 3 of the engine 1, the exhaust gas purifier 11 having a hydrocarbon adsorbing catalyst 2 (HC adsorbing catalyst 2) which is identical to that of the first embodiment, and a catalytic converter 10 independent of (separate from) the HC adsorbing catalyst 2. The catalytic converter 10 comprises a three-way catalyst or the like as with ordinary catalytic converters, and serves to purify unburned gases of HC, CO, NOx, etc. based on oxidizing and reducing reactions of the three-way catalyst or the like. According to the present embodiment, the HC adsorbing catalyst 2 and the catalytic converter 10 are successively arranged downstream in the exhaust passage 3. The exhaust passage 3 has a humidity sensor 4 disposed downstream of the HC adsorbing catalyst 2 and upstream of the catalytic converter 10, and an $O_2$ sensor 5 and a LAF sensor (wide-range air-fuel ratio sensor) 6 which are respectively downstream of the exhaust gas purifier 11 (downstream of the catalytic converter 10) and upstream of the exhaust gas purifier 11 (upstream of the HC adsorbing catalyst 2). These sensors 4 through 6 are identical to those of the first embodiment. The apparatus according to the present embodiment also has an ECU 7, a deterioration evaluating device 8, and a deterioration indicator 9 which are identical to those of the first embodiment. Data that are supplied to the ECU 7 and the deterioration evaluating device 8 are identical to those of the first embodiment.

In the apparatus according to the present embodiment, the ECU 7 performs a processing sequence which is the same as the processing sequence performed in the first embodiment, and calculates the integrated fuel injection quantity $\Sigma tcyl$ and controls the air-fuel ratio of the engine 1 in exactly the same manner as with the first embodiment. The deterioration evaluating device 8 performs a processing sequence which is basically the same as the processing sequence according to the first embodiment, and performs the processing sequence shown in FIGS. 4, 6, and 8 in the same manner as with the first embodiment. The HC adsorbing ability that is evaluated by the deterioration evaluating device 8 according to the present embodiment based on the processing sequence shown in FIGS. 4 and 6 is the HC adsorbing ability of the HC adsorbing catalyst 2 as with the first embodiment. However, the unburned gas purifying ability that is evaluated by the deterioration evaluating device 8 in STEP33 shown in FIG. 8 is the overall unburned gas purifying ability of the exhaust gas purifier 11 which is a combination of the catalytic function of the HC adsorbing catalyst 2 and the catalytic function of the catalytic converter 10. In STEP41 shown in FIG. 8, the deterioration evaluating device 8 judges that the entire exhaust gas purifier 11 is in the deterioration-in-progress state, or stated otherwise judges that either the overall HC adsorbing ability of the exhaust gas purifier 11 (=HC adsorbing ability of the HC adsorbing catalyst 2) or the overall unburned gas purifying ability of the exhaust gas purifier 11 (=the unburned gas purifying ability based on the combination of the catalytic function of the HC adsorbing catalyst 2 and the catalytic function of the catalytic converter 10) is deteriorated. In STEP43 shown in FIG. 8, the deterioration evaluating device 8 judges that the entire exhaust gas purifier 11 is in the non-deteriorated state.

According to the present embodiment, therefore, the overall deteriorated state of the exhaust gas purifier 11 which has the HC adsorbing catalyst 2 and the catalytic converter 10 that are independent of each other can appropriately be evaluated. Since the overall deteriorated state of the exhaust gas purifier 11 can appropriately be evaluated, it is possible to recognize whether the exhaust gas has finally been properly purified by the exhaust gas purifier 11 or not. In particular, since the HC adsorbing ability of the exhaust gas purifier 11 is evaluated using the output data of the humidity sensor 4 as with the first embodiment, the HC adsorbing ability of the exhaust gas purifier 11 can be evaluated accurately at a relatively low cost.

Figure 10:
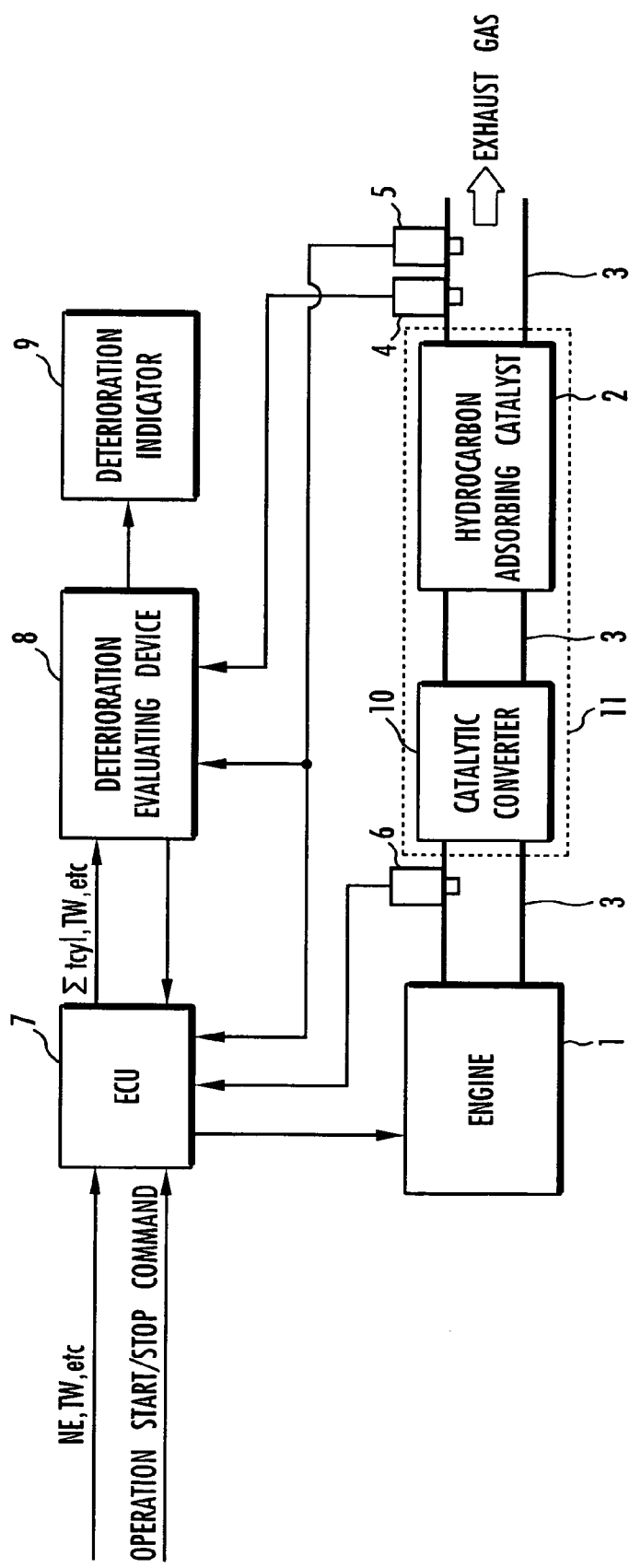
FIG. 10 is a block diagram of an overall system arrangement of an apparatus according to a modification of the second embodiment of the present invention.
Figure 11:
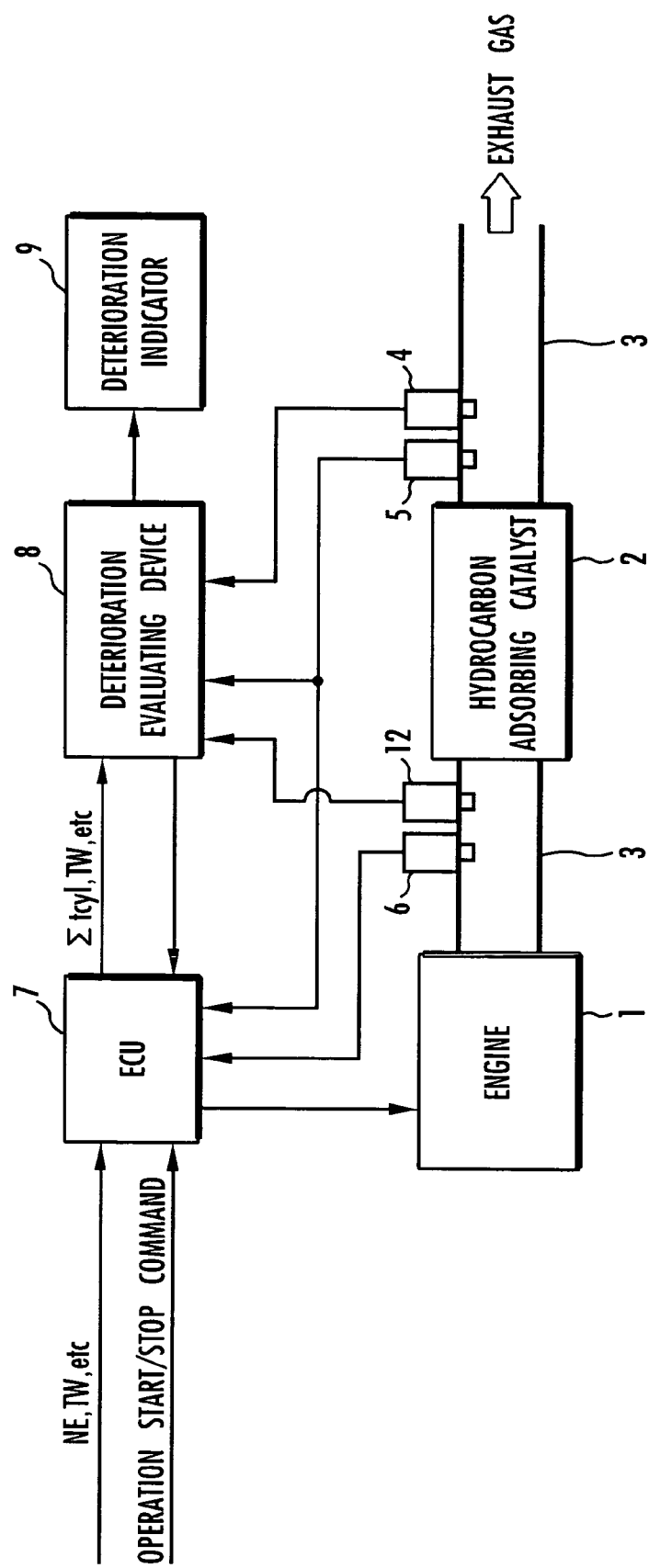
FIG. 11 is a block diagram of an overall system arrangement of an apparatus according to a third embodiment of the present invention.

In the present embodiment, the exhaust gas purifier 11 with the HC adsorbing catalyst 2 disposed upstream and the catalytic converter 10 disposed downstream has been described above by way of illustrative example. However, as shown in FIG. 10, the HC adsorbing catalyst 2 may be disposed downstream and the catalytic converter 10 may be disposed upstream. In order to evaluate the overall deteriorated state of the exhaust gas purifier 11 in such a modification as with the second embodiment, the humidity sensor 4 and the $O_2$ sensor 5 may be disposed downstream of the HC adsorbing catalyst 2 (downstream of the exhaust gas purifier 11), and the LAF sensor 6 may be disposed upstream of the catalytic converter 10 (upstream of the exhaust gas purifier 11).

A third embodiment of the present invention will be described below with reference to FIGS. 11 through 15. The present embodiment is an embodiment according to the second aspect of the present invention. Those parts and functions of the present embodiment which are identical to those of the first embodiment are denoted by identical reference characters, and will not be described in detail below.

An apparatus according to the present embodiment has a humidity sensor 4 disposed downstream of the HC adsorbing catalyst 2 as the exhaust gas purifier as with the first embodiment, and also has another humidity sensor 12 disposed upstream of the HC adsorbing catalyst 2 for detecting the humidity (relative humidity) of the exhaust gas which enters the HC adsorbing catalyst 2. The humidity sensor 12 is disposed in the exhaust passage 3 at a location upstream of and near the HC adsorbing catalyst 2. The humidity sensor 12 is of the same type as the humidity sensor 4 described above in the first embodiment, and has the same output characteristics (see FIG. 2) as the humidity sensor 4 in the first embodiment. The output voltage of the humidity sensor 12 as well as the output voltage of the humidity sensor 4 is supplied to the deterioration evaluating device 8 for the evaluation of the deteriorated state (HC adsorbing ability) of the HC adsorbent of the HC adsorbing catalyst 2. In the present embodiment, the humidity sensors 4, 12 correspond respectively to the downstream humidity sensor and the upstream humidity sensor in the second aspect of the present invention. Other details of the present embodiment are identical to those of the first embodiment.

Operation of the apparatus according to the present embodiment with respect to the evaluation of the deteriorated state of the HC adsorbing catalyst 2 will be described in detail below. When the operation switch (not shown) is turned on to start operation of the engine 1, the ECU 7 and the deterioration evaluating device 8 are activated. The ECU 7 performs a processing sequence which is exactly the same with the first embodiment.

Figure 12:
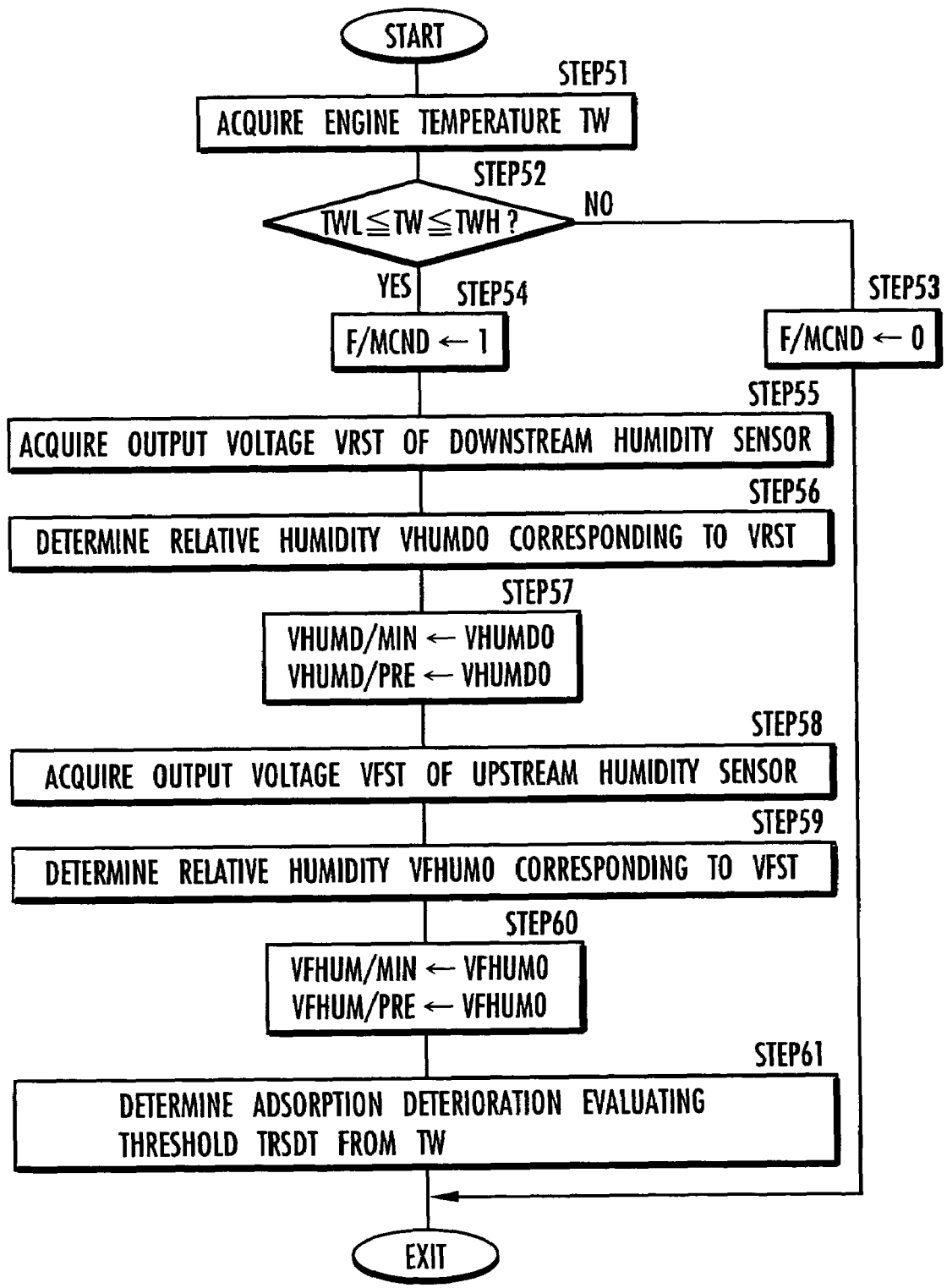
FIGS. 12 through 14 are flowcharts of processing sequences of a deterioration evaluating device in the apparatus shown in FIG. 11.

After the deterioration evaluating device 8 is activated, it performs a processing sequence shown in FIG. 12. The processing sequence shown in FIG. 12 corresponds to the processing sequence shown in FIG. 4 according to the first embodiment, and is performed only when the engine 1 starts operating.

The processing in STEP51 through STEP57 is identical to the processing in STEP1 through STEP7 shown in FIG. 4 according to the first embodiment. In the present embodiment, the deterioration evaluating device 8 performs the processing in STEP58 through STEP60 following STEP57. In STEP58 through STEP60, the deterioration evaluating device 8 performs the same processing as the processing in STEP55 through STEP57 for the downstream humidity sensor 4, with respect to the upstream humidity sensor 12. Specifically, in STEP58, the deterioration evaluating device 8 acquires the present data of the output voltage VFST of the upstream humidity sensor 12. Then, the deterioration evaluating device 8 determines a relative humidity VFHUM0 corresponding to the output voltage VFST as an initial relative humidity upstream of the HC adsorbing catalyst 2 (in the location of the humidity sensor 12) at the start of operation of the engine 1 in STEP59. The initial relative humidity VFHUM0 is determined from the value of the output voltage VFST acquired in STEP58 based on a data table or a formula representative of the output characteristics of the upstream humidity sensor 12 shown in FIG. 2.

The deterioration evaluating device 8 then stores the value of the initial relative humidity VFHUM0 as the value of a minimum humidity parameter VFHUM/MIN representative of the latest value of a minimum value of a humidity (relative humidity) in the location of the humidity sensor 12 upstream of the HC adsorbing catalyst 2, and the value of a preceding relative humidity parameter VFHUM/PRE representative of a preceding value of the relative humidity (a preceding value in each cycle time of the process carried out by the deterioration evaluating device 8) in STEP60. That is, the deterioration evaluating device 8 initializes the values of these parameters VFHUM/MIN, VFHUM/PRE with the value of the initial relative humidity VFHUM0 as the humidity (relative humidity) upstream of the HC adsorbing catalyst 2 at the time the engine 1 starts to operate.

After having performed the processing in STEP58 through STEP60, the deterioration evaluating device 8 performs the processing in STEP61. Then, the deterioration evaluating device 8 puts the processing sequence shown in FIG. 12 to an end. The processing in STEP61 is the same as the processing in STEP8 shown in FIG. 4 according to the first embodiment. The deterioration evaluating device 8 determines an adsorption deterioration evaluating threshold TRSDT with which to determine whether the HC adsorbent of the HC adsorbing catalyst 2 is in the deterioration-in-progress state or the non-deteriorated state from the detected data of the initial engine temperature TW acquired in STEP51 according to a predetermined data table as indicated by the imaginary-line curve in FIG. 5. The data table as indicated by the imaginary-line curve in FIG. 5 is determined by way of experimentation or the like such that, as with the first embodiment, the adsorption deterioration evaluating threshold TRSDT is greater as the engine temperature TW (the temperature of the HC adsorbent of the HC adsorbing catalyst 2) is lower. In the present embodiment, since the timing to calculate the deterioration evaluating parameter is later than the time when the engine 1 starts to operate, the adsorption deterioration evaluating threshold TRSDT (represented by the imaginary-line curve in FIG. 5) is smaller a substantially constant value than the deterioration evaluating threshold TRSDT in the first embodiment.

Figure 13:
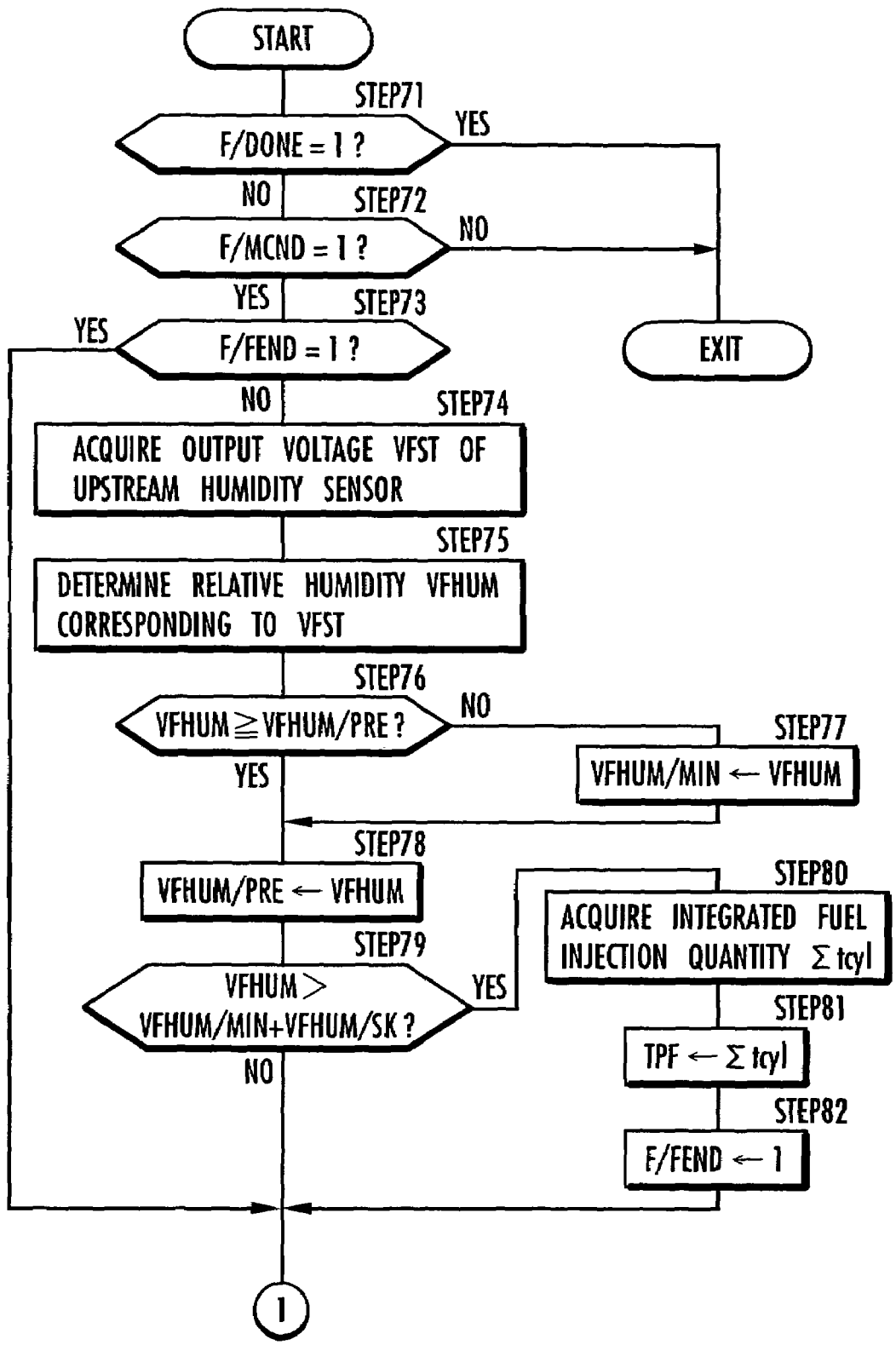
Figure 14:
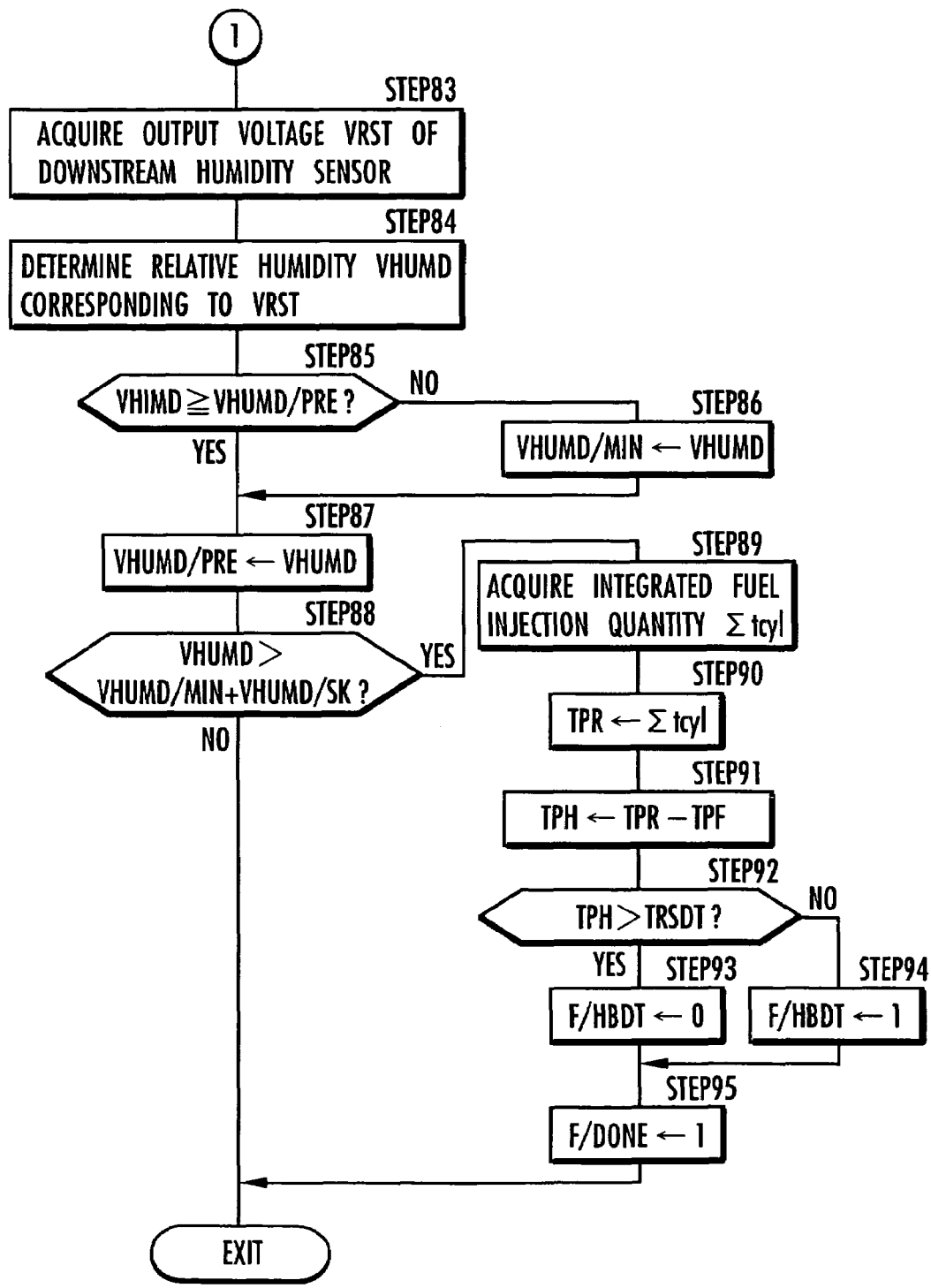

After having executed the routine shown in FIG. 12 at the time when the engine 1 starts to operate, the deterioration evaluating device 8 performs a processing sequence shown in FIGS. 13 and 14 in a predetermined cycle time.

In STEP71, STEP72, the deterioration evaluating device 8 determines the values of the flags F/DONE, F/MCND in the same manner as with the first embodiment. The meanings of these flags F/DONE, F/MCND are identical to those in the first embodiment. If F/DONE=1 in STEP71 or F/MCND=0 in STEP72, then the processing sequence shown in FIGS. 13 and 14 is put to an end.

If F/MCND=1 in STEP72, then the deterioration evaluating device 8 determines the value of a flag F/FEND in STEP73. The flag F/FEND has a value "1" when the relative humidity detected by the upstream humidity sensor 12 is in a monotonously increasing state, and a value "0" when the relative humidity detected by the upstream humidity sensor 12 is not in a monotonously increasing state. The flag F/FEND is initialized to "0" when the engine 1 starts operating. If F/FEND=1 in STEP73, then the deterioration evaluating device 8 performs the processing from STEP83 shown in FIG. 14. If F/FEND=0, then the deterioration evaluating device 8 performs the processing in STEP74 through STEP82 relative to the upstream humidity sensor 12. The processing in STEP74 through STEP82 represents a process of detecting a timing when the humidity VFHUM (relative humidity) represented by the output voltage VFST of the upstream humidity sensor 12 changes from a low humidity to a tendency to increase monotonously to a higher humidity, as an adsorption start timing when the HC adsorbent of the HC adsorbing catalyst 2 starts adsorbing moisture, and corresponds to the processing in STEP13 through STEP20 shown in FIG. 6 which has been described above in the first embodiment with respect to the downstream humidity sensor 4.

The processing in STEP74 through STEP82 will be described below. In step S74, the deterioration evaluating device 8 acquires the present data of the output voltage VFST of the upstream humidity sensor 12. Then, the deterioration evaluating device 8 determines a present relative humidity VFHUM corresponding to the output voltage VFST in STEP75. The relative humidity VFHUM can be determined from the value of the output voltage VFST acquired in STEP74 based on a data table or a formula representative of the output characteristics of the upstream humidity sensor 12.

Then, the deterioration evaluating device 8 compares the value of the relative humidity VFHUM and the present value of the preceding relative humidity parameter VFHUM/PRE with each other in STEP76. If VFHUM≧VFHUM/PRE (the relative humidity VFHUM is increasing), then the deterioration evaluating device 8 updates the value of the preceding relative humidity parameter VFHUM/PRE with the present value of the relative humidity VFHUM determined in STEP75 in STEP78. If VFHUM<VFHUM/PRE (the relative humidity VFHUM is decreasing), then the deterioration evaluating device 8 updates the value of the minimum humidity parameter VFHUM/MIN with the present value of the relative humidity VFHUM in STEP77. Thereafter, the deterioration evaluating device 8 performs the processing in STEP78 to update the value of the preceding relative humidity parameter VFHUM/PRE.

According to the processing in STEP74 through STEP78, therefore, while the relative humidity VFHUM detected by the upstream humidity sensor 12 is decreasing, the value of the minimum humidity parameter VFHUM/MIN is updated in each cycle time of the processing sequence of the deterioration evaluating device 8. While the relative humidity VFHUM is increasing, the value of the minimum humidity parameter VFHUM/MIN is not updated, but held to the minimum value of the relative humidity VFHUM (latest minimum value) immediately before the relative humidity VFHUM starts increasing.

After having performed the processing in STEP78, the deterioration evaluating device 8 compares the present value of the relative humidity VFHUM with a value (= VFHUM/MIN+VFHUM/SK, hereinafter referred to as "upstream increase judgement threshold") which is the sum of the present value of the minimum humidity parameter VFHUM/MIN (the latest minimum value of the relative humidity VFHUM) and a predetermined quantity VFHUM/SK (see FIG. 15) in STEP79 to determine whether the relative humidity VFHUM is monotonously increasing or not.

Figure 15:
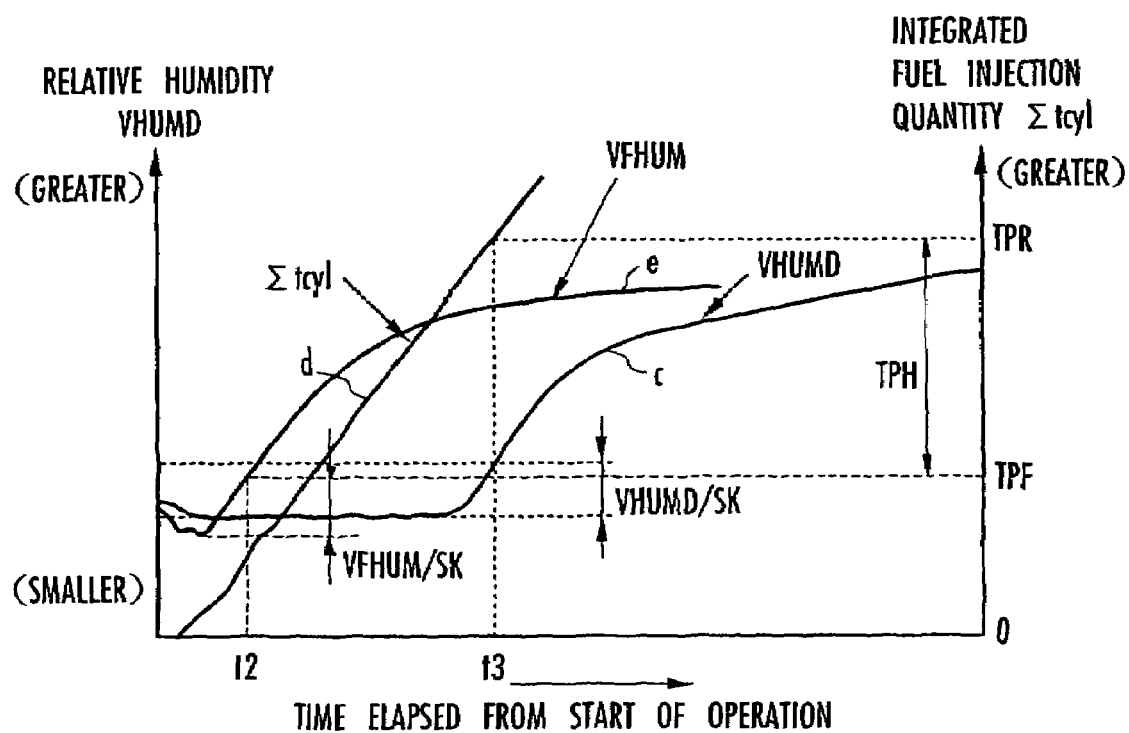
FIG. 15 is a diagram illustrative of the processing sequence of the flowcharts of FIGS. 13 and 14.

As shown in FIG. 15, the relative humidity VFHUM detected by the upstream humidity sensor 12 (the relative humidity upstream of the HC adsorbing catalyst 2) is of a low humidity level during a short period immediately after the engine 1 has started to operate (a period until the exhaust gas containing much moisture reaches a region in the vicinity of the inlet of the HC adsorbing catalyst 2), as indicated by the solid-line curve "e". When the exhaust gas containing much moisture reaches the inlet of the HC adsorbing catalyst 2 (at a time t2 in FIG. 15), the HC adsorbent of the HC adsorbing catalyst 2 starts substantially adsorbing moisture in the exhaust gas, and the relative humidity VFHUM changes to a state in which it increases monotonously to a high humidity due to moisture contained in the exhaust gas. According to the present embodiment, the deterioration evaluating device 8 detects a time (the time t2 in FIG. 15) when the relative humidity VFHUM exceeds the upstream increase judgement threshold (=VFHUM/MIN+VFHUM/SK) which is the sum of the latest minimum value VFHUM/MIN and the predetermined quantity VFHUM/SK, as an adsorption start timing at which the substantial adsorption of moisture by the HC adsorbent of the HC adsorbing catalyst 2.

The solid-line curve "c" in FIG. 15 is a graph representing transition characteristics of the relative humidity VHUMD detected by the downstream humidity sensor 4, and the solid-line curve "d" in FIG. 15 is a graph representing time-depending changes of the integrated fuel injection quantity Σtcyl. The curves "c" and "d" are the same curves as those shown in FIG. 7 with respect to the first embodiment.

The predetermined quantity VFHUM/SK relative to the upstream increase judgement threshold corresponds to the predetermined quantity VHUMD/SK (see FIG. 15) described above in the first embodiment with respect to the downstream humidity sensor 4. Since the upstream humidity sensor 12 and the downstream humidity sensor 4 have substantially the same characteristics in the present embodiment, the predetermined quantity VFHUM/SK relative to the upstream increase judgement threshold is set to the same value as the predetermined quantity VHUMD/SK described above in the first embodiment with respect to the downstream humidity sensor 4, for example. However, the predetermined quantity VFHUM/SK may not necessarily be the same as the predetermined quantity VHUMD/SK, but their values may experimentally be determined separately in view of the transition characteristics of the actual relative humidities upstream and downstream of the HC adsorbing catalyst 2.

STEP79 described above is a decision process for detecting the adsorption saturation timing. If the present value of the relative humidity VHUMD is not in excess of the upstream increase judgement threshold (during a period prior to the time t2 in FIG. 15), the deterioration evaluating device 8 performs the processing from STEP83 shown in FIG. 14 to be described later on.

If VFHUM>the upstream icrease judgement threshold in STEP79, then the deterioration evaluating device 8 judges that the present cycle time is the adsorption start timing, and acquires the data of the present value of the integrated fuel injection quantity Σtcyl from the ECU 7 in STEP80. Then, the deterioration evaluating device 8 stores the value of the integrated fuel injection quantity Σtcyl as the value of an adsorption starting integrated fuel injection quantity TPF at the adsorption start timing of the HC adsorbent of the HC adsorbing catalyst 2 in STEP81. In the example shown in FIG. 15, for example, the integrated fuel injection quantity Σtcyl at the time t2 is stored as the adsorption starting integrated fuel injection quantity TPF. The adsorption starting integrated fuel injection quantity TPF means a total amount of moisture in the exhaust gas which has been generated by the engine 1 from the start of operation of the engine 1 to the adsorption start timing.

Then, the deterioration evaluating device 8 sets the value of the flag F/FEND to "1" in STEP82, and then performs the processing from STEP83 shown in FIG. 14 to be described later on. If the value of the flag F/FEND is set to "1" in STEP82, since the answer to STEP73 becomes YES from a next cycle time and the processing in STEP74 through STEP82 will not be performed, the value of the adsorption starting integrated fuel injection quantity TPF determined in STEP81 will subsequently be held without being changed.

In the processing from STEP83 shown in FIG. 14, the deterioration evaluating device 8 carries out the same processing as in STEP13 through STEP20 shown in FIG. 6 described in the first embodiment, in STEP83 through STEP90. According to the present embodiment, however, in STEP90 (corresponding to STEP20 shown in FIG. 6), the integrated fuel injection quantity Σtcyl at the timing when the relative humidity VHUMD detected by the downstream humidity sensor 4 changes from a low humidity to a monotonously increasing state, i.e., the adsorption saturation timing, is stored, not as a deterioration evaluating parameter, but as the value of an adsorption saturating integrated fuel injection quantity TPR from the start of operation of the engine 1 up to the adsorption saturation timing (which means a total amount of moisture in the exhaust gas which has been generated by the engine 1 from the start of operation of the engine 1 up to the adsorption saturation timing).

The deterioration evaluating device 8 determines a value (=TPR−TPF) that is produced by subtracting the value of the adsorption starting integrated fuel injection quantity TPF determined in STEP81 (see in FIG. 13) from the value of the adsorption saturating integrated fuel injection quantity TPR, as a deterioration evaluating parameter TPH in STEP91. The deterioration evaluating parameter TPH thus determined corresponds to an integrated amount of moisture that is essentially adsorbed by the HC adsorbent of the HC adsorbing catalyst 2 from the adsorption start timing to the adsorption saturation timing.

Then, the deterioration evaluating device 8 carries out the same processing as in STEP21 through STEP23 shown in FIG. 6 described in the first embodiment, in STEP92 through STEP94 to set the value of the flag F/HBDT indicative of whether the HC adsorbing ability of the HC adsorbing catalyst 2 is good or not. Specifically, the deterioration evaluating device 8 compares the value of the deterioration evaluating parameter TPH determined in STEP91 with the adsorption deterioration evaluating threshold TRSDT (see the imaginary-line curve in FIG. 5) determined in STEP61 shown in FIG. 12 at the time the engine 1 has started to operate. If TPH>TRSDT, then the deterioration evaluating device 8 judges that the HC adsorbing ability of the HC adsorbing catalyst 2 is good, and sets the value of the flag F/HBDT to "0". If TPH≦TRSDT, then the deterioration evaluating device 8 judges that the HC adsorbing ability of the HC adsorbing catalyst 2 is deteriorated, and sets the value of the flag F/HBDT to "1". After having performed the processing in STEP92 through STEP94, the deterioration evaluating device 8 sets the value of the flag F/DONE to "1" in STEP95, and then puts the processing sequence shown in FIGS. 13 and 14 to an end. According to the processing sequence shown in FIGS. 13 and 14, as described above, the HC adsorbing ability of the HC adsorbing catalyst 2 is evaluated, and the value of the flag F/HBDT is set depending on whether the HC adsorbing ability of the HC adsorbing catalyst 2 is good or not.

While the ECU 7 is controlling the air-fuel ratio of the engine 1 to converge the output of the $O_2$ sensor 5 to a predetermined target value as described above, the deterioration evaluating device 8 performs the processing sequence shown in FIG. 8 as described above in the first embodiment to evaluate the unburned gas purifying ability based on the catalytic action of the HC adsorbing catalyst 2 for thereby evaluating the overall deteriorated state including the HC adsorbing ability and the unburned gas purifying ability of the HC adsorbing catalyst 2. This process is exactly the same as with the first embodiment. If either one of the HC adsorbing ability and the unburned gas purifying ability of the HC adsorbing catalyst 2 is judged as being deteriorated according to the process shown in FIG. 8, then the overall deteriorated state of the HC adsorbing catalyst 2 is judged as the deterioration-in-progress state. It is judged that the HC adsorbing catalyst 2 is in not deteriorated only when both the HC adsorbing ability and the unburned gas purifying ability of the HC adsorbing catalyst 2 are judged as being good. Therefore, as with the first embodiment, it is not judged that the HC adsorbing catalyst 2 is in the non-deteriorated state when either one of the HC adsorbing ability and the unburned gas purifying ability of the HC adsorbing catalyst 2 is deteriorated, so that the overall deteriorated state of the HC adsorbing catalyst 2 can adequately be evaluated.

In the present embodiment, the humidity sensor 12 is disposed upstream of the HC adsorbing catalyst 2, in addition to the humidity sensor disposed downstream of the HC adsorbing catalyst 2. For evaluating the HC adsorbing ability, the adsorption saturation timing is grasped using the output data of the downstream humidity sensor 4, and the adsorption start timing is grasped using the output data of the upstream humidity sensor 12. The HC adsorbing ability is evaluated based on the deterioration evaluating parameter TPH which represents the integrated amount of moisture supplied to the HC adsorbing catalyst 2 from the adsorption start timing to the adsorption saturation timing thus grasped. Consequently, the reliability of the evaluated result is increased, and hence the reliability of the evaluated deteriorated state of the HC adsorbing catalyst 2 is increased.

A fourth embodiment of the present invention will be described below with reference to FIG. 16. The present embodiment is an embodiment according to the fourth aspect of the present invention. Those parts and functions of the present embodiment which are identical to those of the first through third embodiments are denoted by identical reference characters, and will not be described in detail below.

Figure 16:
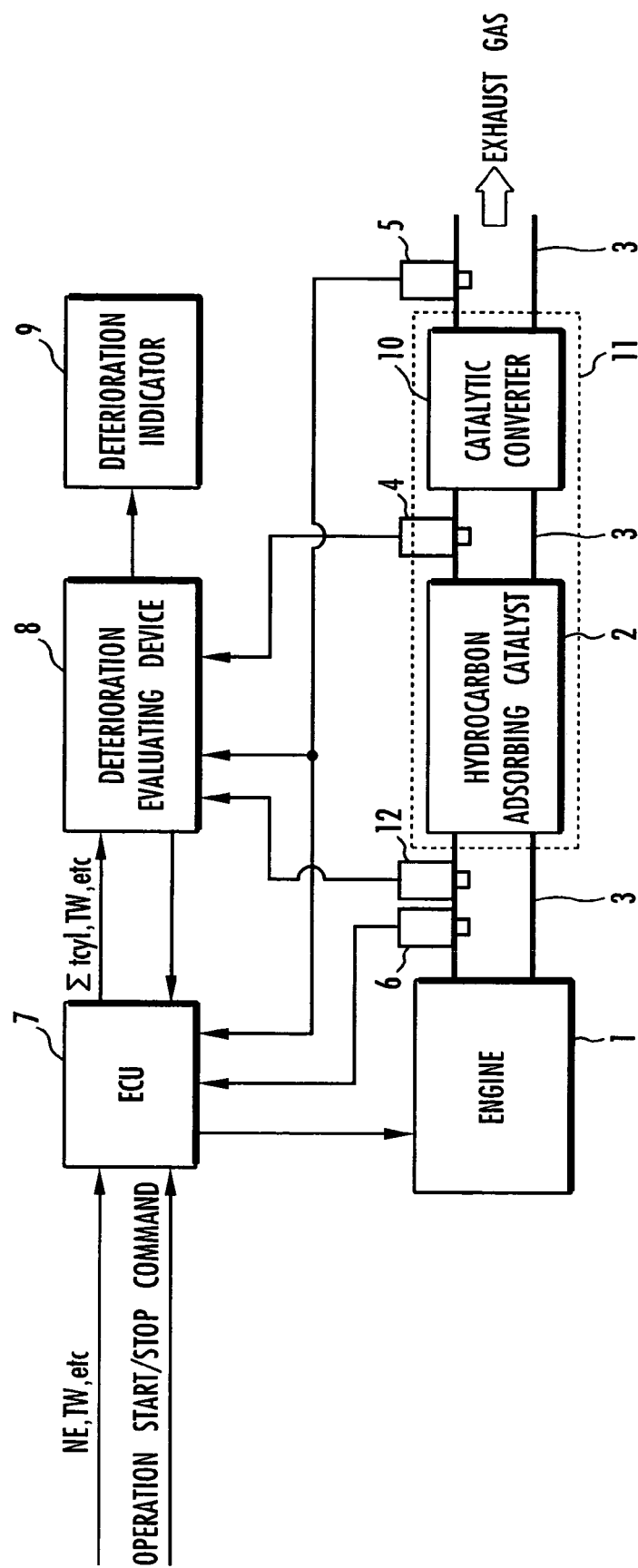
FIG. 16 is a block diagram of an overall system arrangement of an apparatus according to a fourth embodiment of the present invention.

As shown in FIG. 16, the exhaust system of the engine 1 in the apparatus according to the present embodiment has the same arrangement as that of the second embodiment, and has an exhaust gas purifier 11 disposed in the exhaust passage 3 of the engine 1, the exhaust gas purifier 11 having an HC adsorbing catalyst 2 and a catalytic converter 10 independent of (separate from) the HC adsorbing catalyst 2. The HC adsorbing catalyst 2 and the catalytic converter 10 are successively arranged downstream in the exhaust passage 3. A downstream humidity sensor 4 is disposed in the exhaust passage 3 downstream of the HC adsorbing catalyst 2 and upstream of the catalytic converter 10, and an upstream humidity sensor 12 is disposed in the exhaust passage 3 upstream of the HC adsorbing catalyst 2 and in the vicinity of the HC adsorbing catalyst 2. As with the second embodiment, an $O_2$ sensor 5 and a LAF sensor (wide-range air-fuel ratio sensor) 6 are respectively disposed downstream of the exhaust gas purifier 11 (downstream of the catalytic converter 10) and upstream of the exhaust gas purifier 11 (upstream of the HC adsorbing catalyst 2). As with the first through third embodiments, the apparatus according to the present embodiment also has an ECU 7, a deterioration evaluating device 8, and a deterioration indicator 9. Data that are supplied to the ECU 7 and the deterioration evaluating device 8 are identical to those of the third embodiment.

In the apparatus according to the present embodiment, the ECU 7 performs a processing sequence which is the same as the processing sequence performed in the first embodiment, and calculates the integrated fuel injection quantity Σtcyl and controls the air-fuel ratio of the engine 1 in exactly the same manner as with the first embodiment. The deterioration evaluating device 8 performs a processing sequence which is basically the same as the processing sequence according to the third embodiment, and performs the processing sequence shown in FIGS. 13, 14, and 8 in the same manner as with the third embodiment. The HC adsorbing ability that is evaluated by the deterioration evaluating device 8 according to the present embodiment based on the processing sequence shown in FIGS. 13 and 14 is the HC adsorbing ability of the HC adsorbing catalyst 2 as with the third embodiment. However, the unburned gas purifying ability that is evaluated by the deterioration evaluating device 8 in STEP33 shown in FIG. 8 is the overall unburned gas purifying ability of the exhaust gas purifier 11 which is a combination of the catalytic function of the HC adsorbing catalyst 2 and the catalytic function of the catalytic converter 10, as with the second embodiment. In STEP41 shown in FIG. 8, as with the second embodiment, the deterioration evaluating device 8 judges that the entire exhaust gas purifier 11 is in the deterioration-in-progress state, or stated otherwise judges that either the overall HC adsorbing ability of the exhaust gas purifier 11 (=HC adsorbing ability of the HC adsorbing catalyst 2) or the overall unburned gas purifying ability of the exhaust gas purifier 11 (=the unburned gas purifying ability based on the combination of the catalytic function of the HC adsorbing catalyst 2 and the catalytic function of the catalytic converter 10) is deteriorated. In STEP41 shown in FIG. 8, the deterioration evaluating device 8 judges that the entire exhaust gas purifier 11 is in the non-deteriorated state.

According to the present embodiment, as with the second embodiment, therefore, the overall deteriorated state of the exhaust gas purifier 11 which has the HC adsorbing catalyst 2 and the catalytic converter 10 that are independent of each other can appropriately be evaluated. Since the overall deteriorated state of the exhaust gas purifier 11 can appropriately be evaluated, it is possible to recognize whether the exhaust gas has finally been properly purified by the exhaust gas purifier 11 or not. In particular, since the HC adsorbing ability of the exhaust gas purifier 11 is evaluated using not only the output data of the downstream humidity sensor 4 but also the output data of the upstream humidity sensor 12 as with the third embodiment, the HC adsorbing ability can be evaluated with increased reliability.

Figure 17:
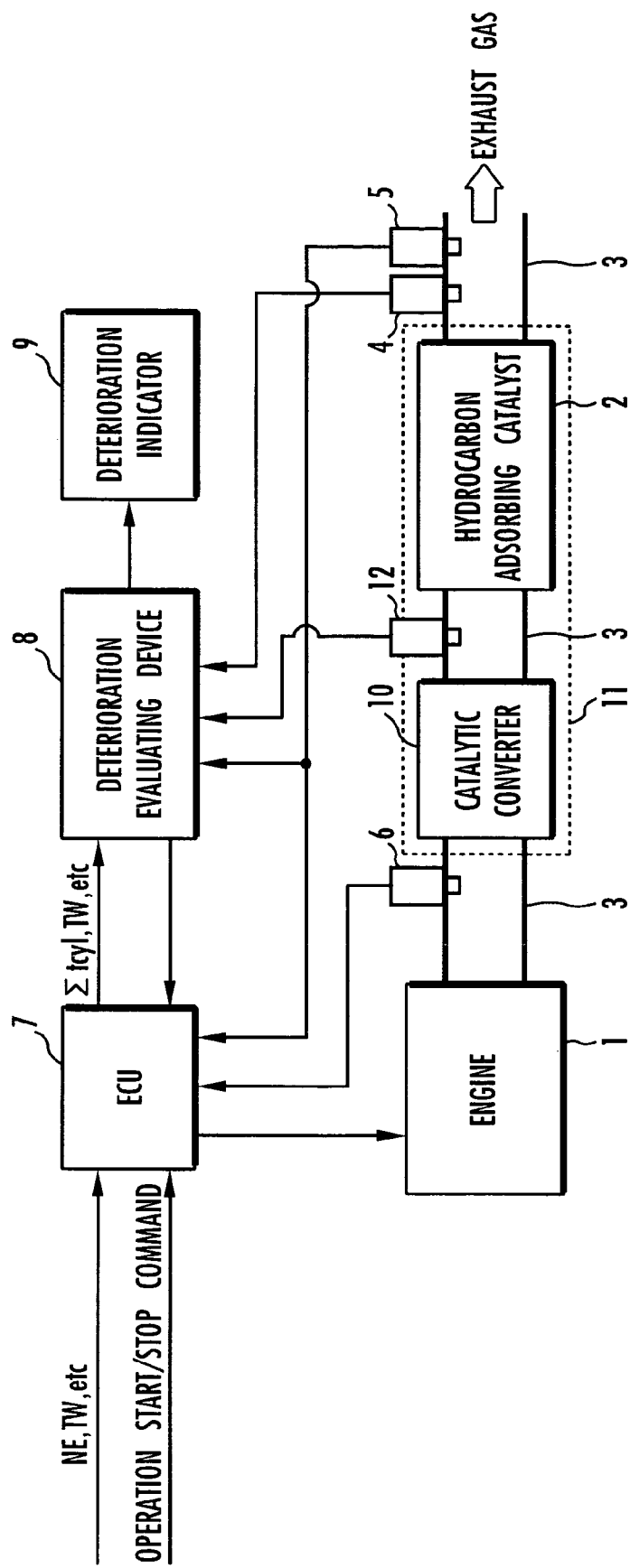
FIG. 17 is a block diagram of an overall system arrangement of an apparatus according to a modification of the fourth embodiment of the present invention.

In the present embodiment, the exhaust gas purifier 11 with the HC adsorbing catalyst 2 disposed upstream and the catalytic converter 10 disposed downstream has been described above by way of illustrative example. However, as shown in FIG. 17, the HC adsorbing catalyst 2 may be disposed downstream and the catalytic converter 10 may be disposed upstream. In order to evaluate the overall deteriorated state of the exhaust gas purifier 11 in such a modification as with the fourth embodiment, the downstream humidity sensor 4 and the $O_2$ sensor 5 may be disposed downstream of the HC adsorbing catalyst 2 (downstream of the exhaust gas purifier 11), the upstream humidity sensor 12 may be disposed between the HC adsorbing catalyst 2 and the catalytic converter 10 (upstream of the HC adsorbing catalyst 2) in the vicinity of the HC adsorbing catalyst, and the LAF sensor 6 may be disposed upstream of the catalytic converter 10 (upstream of the exhaust gas purifier 11).

In the first through fourth embodiments, the technique disclosed in PCT international publication WO/01/46569/A1 by the applicant of the present application is employed to evaluate the unburned gas purifying ability based on the catalytic action of the exhaust gas purifiers 2, 11. However, for the evaluation of the unburned gas purifying ability, any techniques may be employed insofar as they can appropriately evaluate the deteriorated state of an ordinary catalytic converter basically using an air-fuel ratio sensor such as an oxygen concentrations sensor or the like. For example, the technique disclosed in Japanese laid-open patent publication No. 8-144744 by the applicant of the present application may be applied to detect a deterioration of the unburned gas purifying ability based on the catalytic function of the exhaust gas purifiers 2, 11, using the inverted characteristics of the output of an $O_2$ sensor disposed downstream of the exhaust gas purifiers 2, 11 and the inverted characteristics of the outputs of both $O_2$ sensors disposed respectively upstream and downstream of the exhaust gas purifiers 2, 11.

In the first through fourth embodiments, the deterioration indicator 9 makes an indication only depending on the overall deteriorated state of the exhaust gas purifiers 2, 11. However, the deterioration indicator 9 may make an indication depending on the respective evaluations of the HC adsorbing ability and the unburned gas purifying ability of the exhaust gas purifiers 2, 11.

In the first and second embodiments, in the evaluation of the HC adsorbing ability of the exhaust gas purifiers 2, 11 (the HC adsorbing ability of the HC adsorbing catalyst 2), the output voltage VRST of the humidity sensor 4 is converted into the data of the relative humidity VHUMD. However, the output voltage VRST of the humidity sensor 4 may be used as it is. In such a modification, since the output voltage VRST of the humidity sensor 4 which has the output characteristics shown in FIG. 2 decreases when the relative humidity VHUMD increases, the time when the output voltage VRST drops a predetermined quantity from the maximum value thereof after the start of operation of the engine 1 may be detected as the adsorption saturation timing at which the adsorption of moisture and HCs by the HC adsorbent of the HC adsorbing catalyst 2 is saturated. This also holds true for the third and fourth embodiments. Particularly in the third and fourth embodiments, the adsorption start timing may be detected directly using the output voltage VFST of the upstream humidity sensor 12, as when the adsorption saturation timing is detected based on the output voltage VRST of the downstream humidity sensor 4.

INDUSTRIAL APPLICABILITY

As described above, the present invention is useful as an apparatus for evaluating a deteriorated state of an exhaust gas purifier disposed in the exhaust system of an internal combustion engine that is mounted on an automobile or the like.

What is claimed is:

1. An apparatus for evaluating a deteriorated state of an exhaust gas purifier disposed in an exhaust passage of an internal combustion engine and including a hydrocarbon adsorbing catalyst having a function to adsorb hydrocarbons in an exhaust gas which flows through said exhaust passage and a function to purify unburned gases in the exhaust gas based on a catalytic action, comprising:

a humidity sensor disposed downstream of said hydrocarbon adsorbing catalyst for generating an output depending on a humidity of said exhaust gas, an air-fuel ratio sensor disposed at least downstream of said hydrocarbon adsorbing catalyst for generating an output depending on an air-fuel ratio of said exhaust gas, adsorbing ability evaluating means for evaluating a hydrocarbon adsorbing ability of said hydrocarbon adsorbing catalyst using output data of said humidity sensor, and purifying ability evaluating means for evaluating an unburned gas purifying ability of said hydrocarbon adsorbing catalyst using output data of said air-fuel ratio sensor, wherein the deteriorated state of said exhaust gas purifier is evaluated based on evaluated results from both said adsorbing ability evaluating means and said purifying ability evaluating means.

2. An apparatus for evaluating a deteriorated state of an exhaust gas purifier disposed in an exhaust passage of an internal combustion engine and including a hydrocarbon adsorbing catalyst having a function to adsorb hydrocarbons in an exhaust gas which flows through said exhaust passage and a function to purify unburned gases in the exhaust gas based on a catalytic action, comprising:

a downstream humidity sensor and an upstream humidity sensor disposed respectively downstream and upstream of said hydrocarbon adsorbing catalyst for generating respective outputs depending on a humidity of said exhaust gas, an air-fuel ratio sensor disposed at least downstream of said hydrocarbon adsorbing catalyst for generating an output depending on an air-fuel ratio of said exhaust gas, adsorbing ability evaluating means for evaluating a hydrocarbon adsorbing ability of said hydrocarbon adsorbing catalyst using output data of said upstream humidity sensor and said downstream humidity sensor, and purifying ability evaluating means for evaluating an unburned gas purifying ability of said hydrocarbon adsorbing catalyst using output data of said air-fuel ratio sensor, wherein the deteriorated state of said exhaust gas purifier is evaluated based on evaluated results from both said adsorbing ability evaluating means and said purifying ability evaluating means.

3. An apparatus for evaluating a deteriorated state of an exhaust gas purifier disposed in an exhaust passage of an internal combustion engine and including a hydrocarbon adsorbing catalyst having a function to adsorb hydrocarbons in an exhaust gas which flows through said exhaust passage and a function to purify unburned gases in the exhaust gas based on a catalytic action, and a catalytic converter disposed in said exhaust passage independently of said hydrocarbon adsorbing catalyst for purifying the unburned gases based on a catalytic action, comprising:

a humidity sensor disposed at least downstream of said hydrocarbon adsorbing catalyst for generating an output depending on a humidity of said exhaust gas, an air-fuel ratio sensor disposed at least downstream of said exhaust gas purifier for generating an output depending on an air-fuel ratio of said exhaust gas, adsorbing ability evaluating means for evaluating a hydrocarbon adsorbing ability of said hydrocarbon adsorbing catalyst using output data of said humidity sensor, and purifying ability evaluating means for evaluating an overall unburned gas purifying ability of said exhaust gas purifier using output data of said air-fuel ratio sensor, wherein the deteriorated state of said exhaust gas purifier is evaluated based on evaluated results from both said adsorbing ability evaluating means and said purifying ability evaluating means.

4. An apparatus for evaluating a deteriorated state of an exhaust gas purifier disposed in an exhaust passage of an internal combustion engine and including a hydrocarbon adsorbing catalyst having a function to adsorb hydrocarbons in an exhaust gas which flows through said exhaust passage and a function to purify unburned gases in the exhaust gas based on a catalytic action, and a catalytic converter disposed in said exhaust passage independently of said hydrocarbon adsorbing catalyst for purifying the unburned gases based on a catalytic action, comprising:

a downstream humidity sensor and an upstream humidity sensor disposed respectively downstream and upstream of said hydrocarbon adsorbing catalyst for generating respective outputs depending on a humidity of said exhaust gas, an air-fuel ratio sensor disposed at least downstream of said exhaust gas purifier for generating an output depending on an air-fuel ratio of said exhaust gas, adsorbing ability evaluating means for evaluating a hydrocarbon adsorbing ability of said hydrocarbon adsorbing catalyst using output data of said humidity sensors, and purifying ability evaluating means for evaluating an overall unburned gas purifying ability of said exhaust gas purifier using output data of said air-fuel ratio sensor, wherein the deteriorated state of said exhaust gas purifier is evaluated based on evaluated results from both said adsorbing ability evaluating means and said purifying ability evaluating means.

5. An apparatus according to claim 1 or 3, further comprising means for sequentially generating a deterioration evaluating parameter representative of an integrated amount of moisture which is given to said hydrocarbon adsorbing catalyst by said exhaust gas from the time when said internal combustion engine has started to operate, wherein said adsorbing ability evaluating means detects a timing at which the humidity represented by the output data of said humidity sensor becomes a monotonously increasing state while sequentially monitoring the output data of said humidity sensor after said internal combustion engine has started to operate, and compares the value of said deterioration evaluating parameter at the detected timing with a predetermined threshold thereby to evaluate the hydrocarbon adsorbing ability of said hydrocarbon adsorbing catalyst.

6. An apparatus according to claim 5, wherein said adsorbing ability evaluating means sequentially searches for a state in which the humidity represented by the output data of said humidity sensor takes a minimum value after said internal combustion engine has started to operate, and detects the time when the humidity has increased a predetermined amount or more from a latest minimum value thereof, as the timing at which the humidity represented by the output data of said humidity sensor becomes the monotonously increasing state.

7. An apparatus according to claim 2 or 4, further comprising first detecting means for detecting a timing at which the humidity represented by the output data of said upstream humidity sensor becomes a monotonously increasing state while sequentially monitoring the output data of said upstream humidity sensor after said internal combustion engine has started to operate, second detecting means for detecting a timing at which the humidity represented by the output data of said downstream humidity sensor becomes a monotonously increasing state while sequentially monitoring the output data of said downstream humidity sensor after said internal combustion engine has started to operate, and means for generating a deterioration evaluating parameter representative of an integrated amount of moisture which is given to said hydrocarbon adsorbing catalyst by said exhaust gas from the timing detected by said first detecting means to the timing detected by said second detecting means, wherein said adsorbing ability evaluating means compares the value of said deterioration evaluating parameter with a predetermined threshold thereby to evaluate the hydrocarbon adsorbing ability of said hydrocarbon adsorbing catalyst.

8. An apparatus according to claim 7, wherein said first detecting means sequentially searches for a state in which the humidity represented by the output data of said upstream humidity sensor takes a minimum value after said internal combustion engine has started to operate, and detects the time when the humidity has increased a first predetermined amount or more from a latest minimum value thereof, as the timing at which the humidity represented by the output data of said upstream humidity sensor becomes the monotonously increasing state, and said second detecting means sequentially searches for a state in which the humidity represented by the output data of said downstream humidity sensor takes a minimum value after said internal combustion engine has started to operate, and detects the time when the humidity has increased a second predetermined amount or more from a latest minimum value thereof, as the timing at which the humidity represented by the output data of said downstream humidity sensor becomes the monotonously increasing state.

9. An apparatus according to claim 1 or 2, wherein said adsorbing ability evaluating means comprises means for evaluating the hydrocarbon adsorbing ability of said hydrocarbon adsorbing catalyst in two classified high and low levels, and said purifying ability evaluating means comprises means for evaluating the unburned gas purifying ability of said hydrocarbon adsorbing catalyst in two classified high and low levels, and wherein when the hydrocarbon adsorbing ability of said hydrocarbon adsorbing catalyst is evaluated as being in the high level by said adsorbing ability evaluating means and the unburned gas purifying ability of said hydrocarbon adsorbing catalyst is evaluated as being in the high level by said purifying ability evaluating means, said exhaust gas purifier is judged as being not deteriorated, and when either one of the hydrocarbon adsorbing ability and the unburned gas purifying ability is evaluated as being in the low level, said exhaust gas purifier is judged as being deteriorated.

10. An apparatus according to claim 3 or 4, wherein said adsorbing ability evaluating means comprises means for evaluating the hydrocarbon adsorbing ability of said hydrocarbon adsorbing catalyst in two classified high and low levels, and said purifying ability evaluating means comprises means for evaluating the overall unburned gas purifying ability of said exhaust gas purifier in two classified high and low levels, and wherein when the hydrocarbon adsorbing ability of said hydrocarbon adsorbing catalyst is evaluated as being in the high level by said adsorbing ability evaluating means and the unburned gas purifying ability of said exhaust gas purifier is evaluated as being in the high level by said purifying ability evaluating means, said exhaust gas purifier is judged as being not deteriorated, and when either one of the hydrocarbon adsorbing ability and the unburned gas purifying ability is evaluated as being in the low level, said exhaust gas purifier is judged as being deteriorated.

* * * * *